US009053510B2

(12) United States Patent  (10) Patent No.: US 9,053,510 B2
Crum  (45) Date of Patent: Jun. 9, 2015

(54) SHOPPING APPARATUS AND METHODS

(71) Applicant: Shopper's Club, LLC, Louisville, KY (US)

(72) Inventor: Bryan Eugene Crum, Lousiville, KY (US)

(73) Assignee: David L. McEwan, Louisville, KY (US)

( * ) Notice: Subject to any disclaimer, the term of this patent is extended or adjusted under 35 U.S.C. 154(b) by 71 days.

(21) Appl. No.: 13/788,732

(22) Filed: Mar. 7, 2013

(65) Prior Publication Data

US 2013/0185150 A1   Jul. 18, 2013

Related U.S. Application Data

(63) Continuation-in-part of application No. 13/651,040, filed on Oct. 12, 2012, which is a continuation-in-part of application No. 13/112,630, filed on May 20, 2011, now Pat. No. 8,336,774.

(60) Provisional application No. 61/471,508, filed on Apr. 4, 2011.

(51) Int. Cl.
   *G06K 15/00*   (2006.01)
   *G06Q 30/06*   (2012.01)
   *G06Q 30/02*   (2012.01)

(52) U.S. Cl.
   CPC ............ *G06Q 30/0639* (2013.01); *G06Q 30/02* (2013.01); *G06Q 30/06* (2013.01)

(58) Field of Classification Search
   USPC .............. 235/383, 375; 705/26.1, 27.2, 14.54
   See application file for complete search history.

(56) References Cited

U.S. PATENT DOCUMENTS

| 2,864,189 | A | 12/1958 | Campbell |
| 2,888,761 | A | 6/1959 | Miller |
| 3,082,557 | A | 3/1963 | Huff |
| 3,251,543 | A | 5/1966 | Bush et al. |
| 3,964,134 | A | 6/1976 | Newtson |
| 3,982,659 | A | 9/1976 | Ross |
| 4,292,749 | A | 10/1981 | Thomas |
| 4,496,058 | A | 1/1985 | Harris et al. |
| 4,535,912 | A | 8/1985 | Bonk |
| 4,583,753 | A | 4/1986 | Economy |
| 4,685,701 | A | 8/1987 | Amundson et al. |
| 4,848,117 | A | 7/1989 | Welborn et al. |

(Continued)

FOREIGN PATENT DOCUMENTS

| AT | 001523 | 6/1997 |
| BR | 6602284 | 6/1988 |

(Continued)

OTHER PUBLICATIONS

Zmuda, Natalie; Check-in Apps' Next Stop: Your Supermarket Aisles; Article; Nov. 15, 2010; pp. 1-2; AdAge.com; US.

*Primary Examiner* — Ahshik Kim
(74) *Attorney, Agent, or Firm* — Middleton Reutlinger

(57) ABSTRACT

Methods and apparatus related to enabling a shopper to utilize a mobile electronic device to enhance the shopping experience. A shopper may utilize the mobile electronic device to access retail store-specific information regarding the location of items in a retail store. A mobile electronic device may be utilized to compile an electronic shopping list and/or transmit an electronic shopping list. Locations of one or more items in the retail store may be associated with items on the electronic shopping list.

15 Claims, 23 Drawing Sheets

(56) References Cited

U.S. PATENT DOCUMENTS

| | | |
|---|---|---|
| 4,899,886 A | 2/1990 | Johansen |
| 4,901,901 A | 2/1990 | Reitenour |
| 4,978,006 A | 12/1990 | Juteau |
| 4,988,025 A | 1/1991 | Lipton et al. |
| 4,993,583 A | 2/1991 | Chasen |
| 5,002,215 A | 3/1991 | Gregoire |
| 5,004,252 A | 4/1991 | Kraper |
| 5,038,986 A | 8/1991 | Beauchesne |
| 5,048,736 A | 9/1991 | Anatra |
| 5,086,960 A | 2/1992 | Schwietzer |
| 5,114,009 A | 5/1992 | Johnston |
| 5,263,578 A | 11/1993 | Narvey |
| 5,305,935 A | 4/1994 | Weiner |
| 5,306,953 A | 4/1994 | Weiner |
| 5,424,524 A | 6/1995 | Ruppert et al. |
| 5,429,377 A | 7/1995 | Duer |
| 5,489,120 A | 2/1996 | Thornsburg |
| 5,566,609 A | 10/1996 | Kirschner |
| 5,597,104 A | 1/1997 | Elliott |
| 5,617,982 A | 4/1997 | Wilson |
| 5,836,051 A | 11/1998 | Myers |
| 5,848,723 A | 12/1998 | Krautsack |
| D405,820 S | 2/1999 | Larson |
| 5,981,211 A | 11/1999 | Hu et al. |
| 6,000,610 A | 12/1999 | Talbott et al. |
| 6,032,127 A | 2/2000 | Schkolnick et al. |
| 6,158,640 A | 12/2000 | Karp et al. |
| 6,177,880 B1 | 1/2001 | Begum |
| 6,284,177 B1 | 9/2001 | Ewing |
| 6,299,119 B1 | 10/2001 | Dunning |
| 6,453,588 B1 | 9/2002 | Lykens |
| 6,584,712 B2 | 7/2003 | Magid |
| 6,644,501 B2 | 11/2003 | Iida |
| 6,898,884 B1 | 5/2005 | Meyenberg |
| 7,222,101 B2 | 5/2007 | Bishop et al. |
| 7,472,081 B1 | 12/2008 | Cason |
| 7,584,149 B1 | 9/2009 | Bishop et al. |
| 7,782,194 B2 | 8/2010 | Stawar et al. |
| 7,873,543 B2 | 1/2011 | Perrier et al. |
| 8,208,014 B2 | 6/2012 | Geiger et al. |
| 2004/0069918 A1 | 4/2004 | McKinney |
| 2005/0133595 A1 | 6/2005 | Tanase |
| 2006/0011728 A1 | 1/2006 | Frantz et al. |
| 2008/0052159 A1 | 2/2008 | Balakrishman et al. |
| 2009/0150218 A1 | 6/2009 | Brunner et al. |
| 2009/0192892 A1 | 7/2009 | Cason |
| 2009/0234731 A1 | 9/2009 | Mariotti |
| 2009/0327151 A1 | 12/2009 | Carlson et al. |
| 2010/0070369 A1 | 3/2010 | Fenton et al. |
| 2010/0078475 A1 | 4/2010 | Lin et al. |
| 2010/0262554 A1* | 10/2010 | Elliott ............................ 705/323 |
| 2010/0272193 A1 | 10/2010 | Khan et al. |
| 2010/0274647 A1 | 10/2010 | Earle |
| 2011/0047023 A1 | 2/2011 | Lieblang et al. |
| 2011/0062237 A1 | 3/2011 | Chaves |
| 2011/0071895 A1 | 3/2011 | Masri |
| 2012/0296770 A1 | 11/2012 | Lin et al. |
| 2013/0013511 A1* | 1/2013 | Dooley Maley et al. ....... 705/44 |

FOREIGN PATENT DOCUMENTS

| | | |
|---|---|---|
| BR | MU85030880 | 1/1998 |
| BR | MU82019452 | 5/2004 |
| BR | D1166006899 | 5/2005 |
| BR | P1196079711 | 2/2006 |
| BR | P103036839 | 7/2007 |
| CA | 2459153 | 10/2004 |
| DE | 19955074 | 5/2001 |
| EP | 0895920 | 3/1998 |
| FR | 2713004 | 6/1995 |
| GB | 2176332 | 12/1986 |
| GB | 2386354 | 9/2003 |
| KR | 1020100088394 | 8/2010 |
| WO | 9200560 | 6/1997 |
| WO | 9721207 | 6/1997 |
| WO | 2006117627 | 11/2006 |

* cited by examiner

SHOPPING APPARATUS AND METHODS

CROSS-REFERENCE TO RELATED DOCUMENTS

This Application claims priority to and is a continuation-in-part under 35 U.S.C. §120 of U.S. patent application Ser. No. 13/651,040 filed Oct. 12, 2012 and entitled "Shopping Apparatus and Methods," which is a continuation-in-part of U.S. patent application Ser. No. 13/112,630 (U.S. Pat. No. 8,336,774) filed May 20, 2011 and entitled "Shopping Apparatus and Methods," which claims priority to U.S. Provisional Application Ser. No. 61/471,508 filed Apr. 4, 2011 and entitled "Shopping Apparatus and Methods." All of the aforementioned patent applications are hereby incorporated by reference.

TECHNICAL FIELD

The present invention is directed generally to aspects of apparatus and methods related to shopping. More particularly, various inventive methods and apparatus disclosed herein relate to enabling a shopper to utilize a mobile electronic device to enhance a shopper's experience.

BACKGROUND

Many stores utilize one or more strategies to entice consumers to patronize their store and/or to gather purchasing data from consumers. For example, many retail stores have a rewards card that may be scanned during the check-out procedure to thereby entitle the shopper to a discount on the current purchase and/or to an allotment of points that may be used for future purchases and/or rewards. Such rewards cards may entice the shopper to shop at a store to obtain discounts and/or points and may also enable a store to gather data concerning that shopper.

Also, for example, many retail stores may utilize advertisements and/or coupons, optionally in combination with the rewards card, to entice consumers to patronize their store. For example, circular ads may tout specials that may be obtained through utilization of the rewards card. Also, for example, coupons may be scanned during the check-out procedure to thereby entitle the shopper to a discount on one or more items they purchase.

Although such strategies may provide enticement for customers to patronize a store and/or may enable for the gathering of purchasing data from consumers, they may have one or more drawbacks and/or may be improved in one or more ways. For example, rewards cards, circular ads, and coupons do not provide a pecuniary benefit to a shopper until during the checkout process. Also, for example, shoppers may not have sufficient motivation to view a circular ad and/or coupon. Also, for example, circular ads and/or coupons may not be tailored to a particular shopper and/or a particular store. Also, for example, coupons and/or other product information may not be adequately targeted to a particular shopper.

Thus, applicant has recognized and appreciated a need to provide methods and/or apparatus that enable a shopper to utilize a mobile electronic device to organize shopping related information, provide shopping related information, and/or receive information geared toward the shopper, while optionally overcoming one or more drawbacks of and/or improving upon previous methods and apparatus.

SUMMARY

The present disclosure is generally directed to various aspects of apparatus and methods related to shopping. For example, some aspects are directed toward methods and apparatus related to enabling a shopper to utilize a mobile electronic device to check-in to a physical store while at the store. For example, in some embodiments a shopper may utilize a mobile electronic device to scan a check-in code at a location proximal to an entrance of a physical store. For example, the check-in code may be attached to a shopping cart and scanned by the mobile electronic device shortly after entering the store. A substantially instantaneous pecuniary reward may be provided to the shopper upon reading of the check-in code and the shopper may be substantially instantly notified of such reward via the mobile electronic device. Also, for example, some aspects are directed to enabling shoppers to utilize a mobile electronic device to compile an electronic shopping list and/or send an electronic shopping list. In some embodiments one or more coupons may optionally be conveyed to the shopper via the electronic mobile device in response to the shopper providing the electronic shopping list.

Generally, in one aspect a method is provided the includes the steps of: electronically receiving data from a mobile electronic device that uniquely identifies a shopper and presence of the shopper at a physical retail store; electronically receiving in combination with the data, an electronic shopping list generated by the shopper, the electronic shopping list identifying products in which the shopper has interest in purchasing and retail source information uniquely identifying at least one associated retail location to purchase each of the products on the electronic shopping list; identifying at least one selected product of the products; and transmitting a product-specific special offer to the mobile electronic device, the product-specific special offer specific to the selected product of the electronic shopping list.

In some embodiments the product-specific special offer is specific to the physical retail store.

In some embodiments the physical retail store is a competing store to the associated retail location of one or more of the products.

In some embodiments the product-specific special offer is for a competing product to the selected product.

In some embodiments the product-specific special offer requires purchase of the selected product in combination with additional products not on the electronic shopping list.

In some embodiments the mobile electronic device identifies presence of the shopper at the physical store from at least one of GPS data, scanning a check-in code, and Wi-Fi.

Generally, in another aspect a method is provided the includes the steps of: electronically receiving an electronic shopping list generated by a shopper, the electronic shopping list identifying products in which the shopper has interest in purchasing and including at least one associated retail store for one or more of the products, the shopping list including a first product of the products associated with a first retail store of the at least one associated retail store; identifying, in response to receiving the shopping list, a first special offer associated with the first product; and notifying the shopper via a mobile electronic device of the first special offer, the first special offer useable at a retail location distinct from the first retail store.

In some embodiments the method further includes the step of electronically receiving a second product of the products associated with a second retail store of the at least one retail store, the first retail store and the second retail store distinct from one another. In some versions of those embodiments the retail location is associated with the second retail store. In some versions of those embodiments the retail location is a competitor of the first retail store and the second retail store.

In some embodiments the first product is associated with a first brand.

In some versions of those embodiments the first special offer is associated with a particular brand that is distinct from the first brand.

Generally, in another aspect a method is provided the includes the steps of: receiving a first request from a shopper to add a first product to an electronic shopping list of the shopper, the first request originating from a mobile electronic device and including a first product information uniquely identifying the first product and a first retail source information uniquely identifying a first retail location to purchase the first product; receiving a second request from a shopper to add a second product to an electronic shopping list of the shopper, the second request originating from a mobile electronic device and including a second product information uniquely identifying the second product and a second retail source information uniquely identifying a second retail location to purchase the second product; adding the first product information to the electronic shopping list; adding the second product information to the electronic shopping list; associating the first retail source information with the first product information; associating the second retail source information with the second product information; providing the electronic shopping list to the shopper for display; and providing the electronic shopping list to at least one server for analysis of the electronic shopping list in response to association of the shopper with a specific retail location.

In some embodiments the request is generated via selection of the product from an electronic advertisement viewed via the mobile electronic device.

In some embodiments the method further includes electronically receiving check-in data from the mobile electronic device, the check-in data identifying presence of the shopper at the specific retail location. In some versions of those embodiments the check-in data is received via the mobile electronic device, the mobile electronic device sending the check-in data in response to scanning a check-in code. In some versions of those embodiments the check-in code is proximal to an entrance of the specific retail location. In some versions of those embodiments the check-in data is received in response to location information of the mobile electronic device identifying presence of the shopper at the specific physical retail location.

In some embodiments the server includes at least one server analyzing products on the electronic shopping list and distributing selective information to a retail computing device, the selective information utilized by the retail computing device to send at least one targeted shopping incentive to the shopper based on the electronic shopping list.

In some embodiments the server includes at least one server analyzing products on the electronic shopping list and sending at least one targeted shopping incentive to the shopper.

In some versions of those embodiments the targeted shopping incentive is based on product information of the electronic shopping list.

Generally, in another aspect a computer implemented method of utilizing an electronic shopping list is provided and includes the steps of: receiving location data from a mobile electronic device of a shopper in response to the shopper scanning a code at a physical retail store utilizing the mobile electronic device, the location data identifying the physical retail store; identifying an electronic shopping list generated by the shopper, the electronic shopping list identifying products in which the shopper has interest in purchasing; identifying a selected product of the products; and associating a store-specific location with the selected product in response to the shopper scanning the code at the physical retail store utilizing the mobile electronic device, the store-specific location indicative of a location in the physical retail store where the selected product is located.

In some embodiments the location data is based at least partially on at least one of GPS data and Wi-Fi.

In some embodiments the method further includes sorting the products of the electronic shopping list to create a sorted electronic shopping list. In some of versions those embodiments, the sorted electronic shopping list is sorted at least partially based on at least one store-specific location associated at least one product on the electronic shopping list.

In some embodiments the store-specific location is one of an aisle designation and a department name.

In some embodiments the method further includes identifying a product-specific special offer, the product-specific special offer specific to the selected product.

Generally, in another aspect a method of utilizing an electronic shopping list to locate products is provided and includes the steps of: receiving data from a mobile electronic device of a shopper in response to scanning a code at a physical retail store utilizing the mobile electronic device; identifying the physical retail store in response to receiving the data; identifying product location information of the physical store, the product location information indicative of actual locations of in-store products in the physical retail store; identifying an electronic shopping list of listed products in which the shopper has interest in purchasing; and associating at least one store-specific location with a product of the listed products on the electronic shopping list, wherein at least one store-specific location is at least partially based on the product location information and indicative of where at least one product is located in the physical retail store.

In some embodiments the physical retail store is identified at least partially based on GPS data.

In some embodiments the physical retail store is identified at least partially based on Wi-Fi data.

In some embodiments the physical retail store is identified at least partially by store identification data that is embedded in the code.

In some embodiments the code is a check-in code.

In some embodiments the method further includes sorting the products of the electronic shopping list to create a sorted electronic shopping list. In some versions of those embodiments the sorted electronic shopping list is sorted at least partially based on an alphabetical ordering of the products on the electronic shopping list. In other versions of those embodiments the sorted electronic shopping list is sorted at least partially based on at least one store-specific location.

In some embodiments the product location information is a map of the physical store.

Generally, in another aspect a method of utilizing an electronic shopping list to locate products is provided and includes the steps of: receiving a shopping list annotation notification from a mobile electronic device of a shopper, the shopping list annotation notification received in response to the shopper interacting with an in-store interface in a physical retail store utilizing the mobile electronic device; identifying product location information of the physical store, the product location information indicative of physical locations of in-store products in the physical store; identifying an electronic shopping list of listed products that the shopper has interest in purchasing; and associating at least one store-specific location with a product on the electronic shopping list, where at least one store-specific location is based at least partially on the product location information and indicates where the product is located in the physical retail store.

In some embodiments the in-store interface is a scannable code.

In some embodiments the physical store is identified based on store identification data that is embedded in the scannable code. In some versions of those embodiments the physical store is identified at least partially based on one of Wi-Fi data and GPS data.

In some embodiments the electronic shopping list is sorted into a sorted electronic shopping list at least partially based on the store-specific locations associated with the products on the electronic shopping list, wherein the products which have proximate the store-specific locations relative to one another are grouped together in the sorted electronic shopping list.

Generally, in another aspect, a method of utilizing an electronic shopping list to locate products is provided and includes the steps of: alerting a shopper of an offer to annotate an electronic shopping list, the offer being present in a physical retail store where the shopper is present; receiving an electronic shopping list generated by the shopper, the electronic shopping list identifying products in which the shopper has interest in purchasing; identifying a selected product of the products; and associating a store-specific location with the selected product, the store-specific location indicative of a location in the physical retail store where the selected product is located.

In some embodiments the offer is one of a scannable code and an alphanumeric code that is entered into the mobile electronic device by the shopper.

In some embodiments, the method further includes identifying a product-specific special offer, the product-specific special offer specific to the selected product.

In some embodiments, the method further includes sorting the products of the electronic shopping list to create a sorted electronic shopping list. In some versions of those embodiments, the sorted electronic shopping list is sorted at least partially based on at least one store-specific location associated at least one product on the electronic shopping list.

Generally, in other aspects, other apparatus, systems, and/or methods related to shopping are provided. Such apparatus, systems, and/or methods may utilize a mobile electronic device to enhance a shopping experience for a shopper and/or for a store.

In other embodiments, a method is disclosed of utilizing an electronic shopping list to locate products within a physical retail store location. This method may include receiving a shopping list annotation notification from a mobile electronic device of a shopper indicating a desire of a shopper to obtain shopping item locations on a first electronic shopping list stored by the mobile electronic device. The first electronic shopping list may include a list of products that the shopper has an interest in purchasing. The method may further include identifying a physical retail store by the mobile electronic device and also, once the physical retail store location is identified, identifying product location information in the physical store for a plurality of products listed in the first electronic shopping list stored by the mobile electronic device. The product location information may be indicative of physical locations of in-store products in the physical store. The method may further associate at least one store-specific location with a product on the electronic shopping list in order to create, in some alternative embodiments, a second electronic shopping list. In various embodiments, the second electronic shopping list may include a subset of items of the first electronic shopping list and be indicative of items on the first electronic shopping list which are actually located in the physical store. In some embodiments, the second electronic shopping list may include a subset of items and appended associated store-specific product location information indicating where each of the subset of items are located in the physical retail store.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

The present disclosure is described with narrative and reference to flowcharts and/or diagrams that illustrate methods, apparatus or systems, and computer program product. Each portion of the narrative, block of the various flowcharts, and combinations of blocks in the flowcharts, can be implemented by computer program instructions. Such computer program instructions can be loaded onto a general-purpose computer, special-purpose computer, or other programmable data processing device to produce a machine, such that the instructions that execute on the computer or other programmable data processing apparatus create means for implementing the functions specified in the flowcharts or elsewhere in this specification. The computer program instructions can also be stored in a computer-readable memory that directs a computer or other programmable data processing device to function in a particular manner, such that the instructions stored in the computer-readable memory produce an article of manufacture including instruction means which implement the function specified in the flowcharts or diagrams. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowcharts or diagrams.

It will be understood that blocks of the flowcharts and other aspects of this specification support combinations of systems for performing the specified functions, combinations of steps for performing the specified functions, and program instructions for performing the specified functions. Each block of the flowcharts or diagrams, combinations of blocks in the flowcharts or diagrams, and other aspects of the specification can be implemented by special-purpose, hardware-based computer systems which perform the specified functions or steps, or combinations of special-purpose hardware and computer instructions.

Aspects of the present disclosure can be implemented using any computer programming language, now known or developed in the future. Likewise, various computers and/or processors may be used to carry out aspects of the present disclosure without being limited to those described herein. Other implementations may include a non-transitory computer readable storage medium storing instructions executable by a processor to perform a method such as one or more of the methods described above. Yet another implementation may include a system including memory and one or more processors operable to execute instructions, stored in the memory, to perform a method such as one or more of the methods described above.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

In the following detailed description, for purposes of explanation and not limitation, representative embodiments disclosing specific details are set forth in order to provide a thorough understanding of the claimed invention. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatuses and methods may be omitted so as to not obscure the description of the representative embodiments. Such methods and apparatuses are clearly within the scope of the claimed invention. For example, check-in barcodes may be depicted herein as Quick Response (QR) barcodes. However, one or more check-in barcodes having other configurations may be implemented in certain embodiments of the methods and apparatus described herein and implementation of the other configurations in alternatively configured methods and apparatus is contemplated without deviating from the scope or spirit of the claimed invention. For example, one or more Semacode barcodes, High Capacity Color Barcodes, ShotCode barcodes, Aztec barcodes, matrix barcodes, and/or other barcodes having an optical machine-readable representation of data may be utilized.

Figure 1:
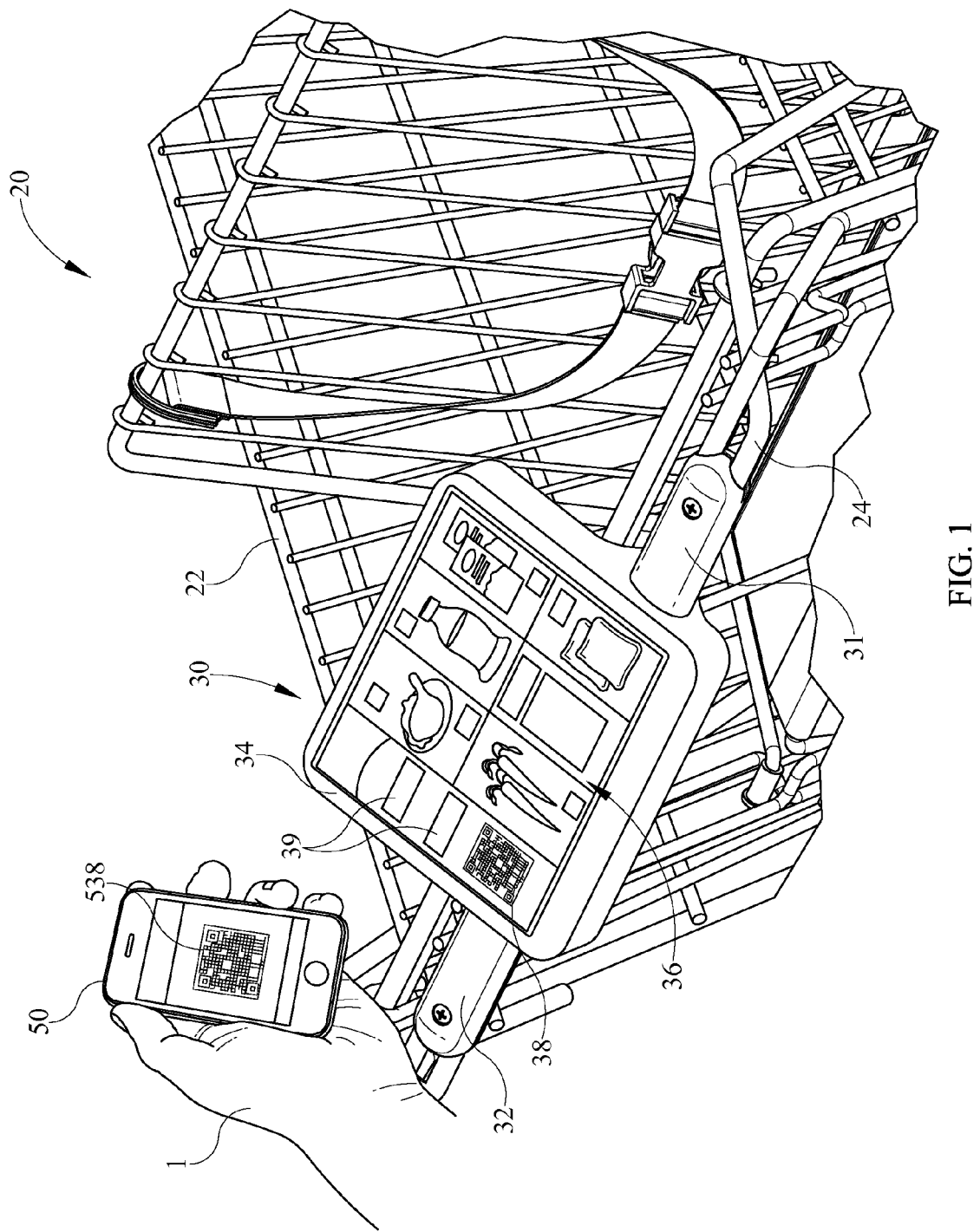
FIG. 1 illustrates a shopping cart having a display with a check-in barcode; a mobile electronic device of a shopper is positioned adjacent the check-in barcode.

Referring to FIG. 1, a shopping cart 20 is illustrated. The shopping cart 20 includes a basket 22 and a handle 24 extending rearwardly from the basket 22 for driving and steering the shopping cart 20. An informational display 30 is attached to the handle 24 via engagement of handles 31 and 32 of the informational display 30 with the handle 24 of the shopping cart 20. The informational display 30 may be fixedly or removably attached to the handle 24. In alternative embodiments the informational display 30 may optionally be integrally formed with the handle 24. The informational display 30 includes a housing 34 that removably retains a magazine insert 36 having a QR type check-in barcode 38 on an outward facing side of an outermost page thereof. Instructions 39 are provided adjacent the check-in barcode 38 that provide graphic and/or written instructions to a shopper. The instructions generally inform the shopper to scan the check-in barcode 38 utilizing a mobile electronic device.

Figure 22:
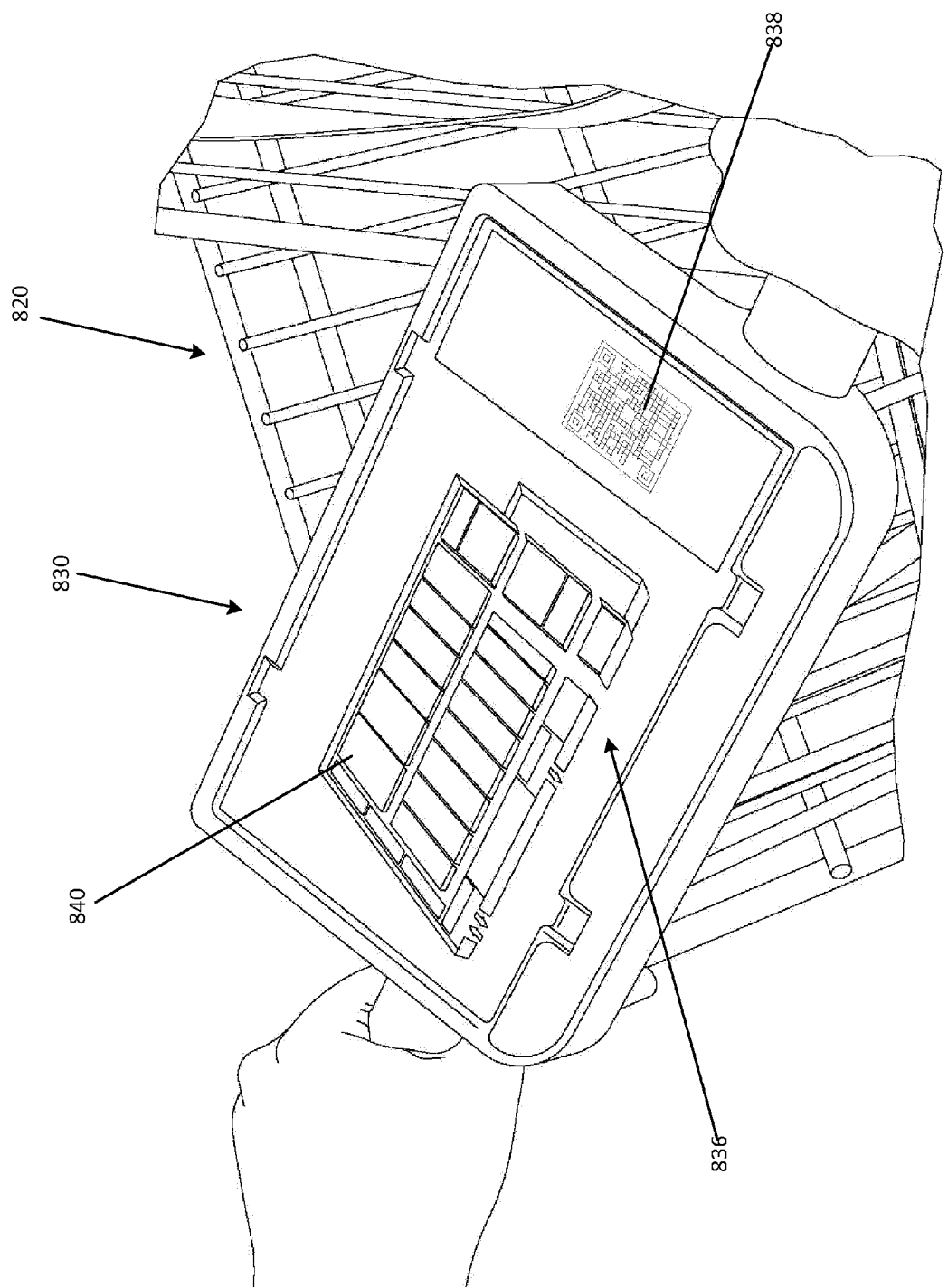
FIG. 22 illustrates a shopping cart having a display with a store map and barcode.

The magazine insert 36 includes a plurality of individual pages that are bound to one another. Some of the individual pages may optionally be provided with information on both sides thereof. The magazine insert 36 may include additional shopping related information and/or advertisement information. For example, the magazine insert 36 may include store specials, a store map 836 as illustrated in FIG. 22 and described herein, a store item index, one or more recipes, one or more shopping checklists, one or more project tutorials, one or more advertisements for items in the store, one or more advertisements for nearby businesses, and/or other shopping related information and/or advertisement information. In alternative embodiments the magazine insert 36 may only include a single sheet, optionally with information on only one side thereof. The magazine insert 36 may be periodically replaced to, inter alia, change information thereon, for aesthetic purposes, and/or to change the check-in barcode 38. The magazine insert 36 may be removably retained on the housing 34 utilizing, for example, one or more of an adhesive, clips, a retaining lip sized to fit around all or portions of the periphery of the magazine insert 36, screws, zip ties, and/or other retention apparatus and/or methods.

Although a check-in barcode 38 is depicted herein as being on a particular magazine insert 36 removably received in a housing 34 attached to a handle 24, one of ordinary skill in the art, having had the benefit of the present disclosure, will recognize and appreciate that in alternative embodiments the check-in barcode 38 may be otherwise coupled to or integrally formed with the shopping cart 20. For example, the check-in barcode 38 may be on a sheet insert removably attachable to a housing on the basket 22, may be encased behind a clear outer casing of the handle 24, may be molded into a plastic basket 22 and/or handle 24, and/or may be attached via a clip removably attached to the shopping cart 20.

Moreover, as described in detail herein, one of ordinary skill in the art, having had the benefit of the present disclosure, will recognize and appreciate that in some alternative embodiments the check-in barcode 38 may be provided coupled to alternative items that may be proximal to the entrance of a store. For example, in some embodiments the check-in barcode 38 may be provided on posters positioned proximal to the entrance of a store, may be provided on an entrance door of a store, may be provided on standalone displays provided proximal to the entrance of a store, may be provided on small shopping baskets provided proximal to the entrance of a store, and/or may be provided on a circular ad and/or circular ad stand provided proximal to the entrance of a store. Providing the check-in barcode 38 proximal to the entrance of a store may provide a shopper with the opportunity to utilize the check-in barcode 38 within the first minutes of entering the store.

A hand 1 of a shopper is also depicted in FIG. 1 holding a cell phone 50 adjacent to the check-in barcode 38. The shopper has just utilized the cell phone 50 to scan the check-in barcode 38 and an image 538 of the check-in barcode 38 is still visible on the screen of the cell phone 50. In some embodiments the cell phone 50 may scan the check-in barcode 38 by utilizing a camera of the cell phone to temporarily capture one or more images of the check-in barcode 38 and analyzing the check-in barcode 38 within the image(s). In other embodiments the mobile phone 50 may capture one or more images of the check-in barcode 38 and send the image(s) to a server for analysis. As described in detail herein, once the shopper has scanned the check-in barcode 38, the shopper will be checked-in to the store and a substantially instantaneous pecuniary reward may be provided to the shopper. Moreover, additional information regarding the store, items in the store, projects related to items in the store, etc. may optionally be provided to the shopper after scanning the check-in barcode 38. Such additional information may optionally be tailored to the shopper. For example, the cell phone 50 may be provided with information regarding the location of one or more items in the store. The location of items may be sent to the cell phone 50 based on items that the shopper has indicated an interest in purchasing utilizing, for example, an electronic shopping list accessed via cell phone 50.

Checking-in may include communication between cell phone 50 and one or more remote computing devices. For example, barcode 38 may contain an embedded website address which is accessed by the cell phone when a shopper scans the barcode 38. In some embodiments, information from barcode 38 may be utilized by one or more applications on a mobile electronic device to identify the current location of the shopper. In various applications, communication between the cell phone and remote computing devices may be automated such that the remote computing devices or servers may receive a shopping list annotation notification from a mobile electronic device of a shopper indicating a desire of a shopper to obtain shopping item locations of items on a first electronic shopping list stored by the mobile electronic device. This notification may be automated upon a shopper entering a store or may be activated by a user opening up an application or other activity. The first electronic shopping list may include a list of products that the shopper has an interest in purchasing. The mobile electronic shopping device may be capable of identifying the physical retail store by various geo-location techniques Scanning a barcode 38 utilizing cell phone 50 may initiate contact with a remote server. The remote server may share one or more characteristics with server 207, 209, and/or 212 of FIG. 10, server 605 of FIG. 15, and/or server 625 of FIG. 16. Alternatively or additionally, an application executing locally on cell phone 50 may be notified of the scanned barcode 38. Barcode 38 may have encoded information regarding the specific store where the shopper is located and may send a message to the server informing the server of the presence of the shopper. Additionally or alternatively, cell phone 50 may send an electronic shopping list that has been stored on cell phone 50. For example, a URL may be encoded in barcode 38 to facilitate the initiation of a communication channel between cell phone 50 and a remote server. Cell phone 50 may send a notification of the specific store where the shopper is located and a stored shopping list. The server may send information to cell phone 50 that is specific to the retail and pertinent to the shopper, such as store-specific coupons and/or locations of items in which the shopper has expressed interest in purchasing. In some implementations, store location may be determined using GPS, Wi-Fi, and/or BLUETOOTH in conjunction with barcode 38.

Figure 2:
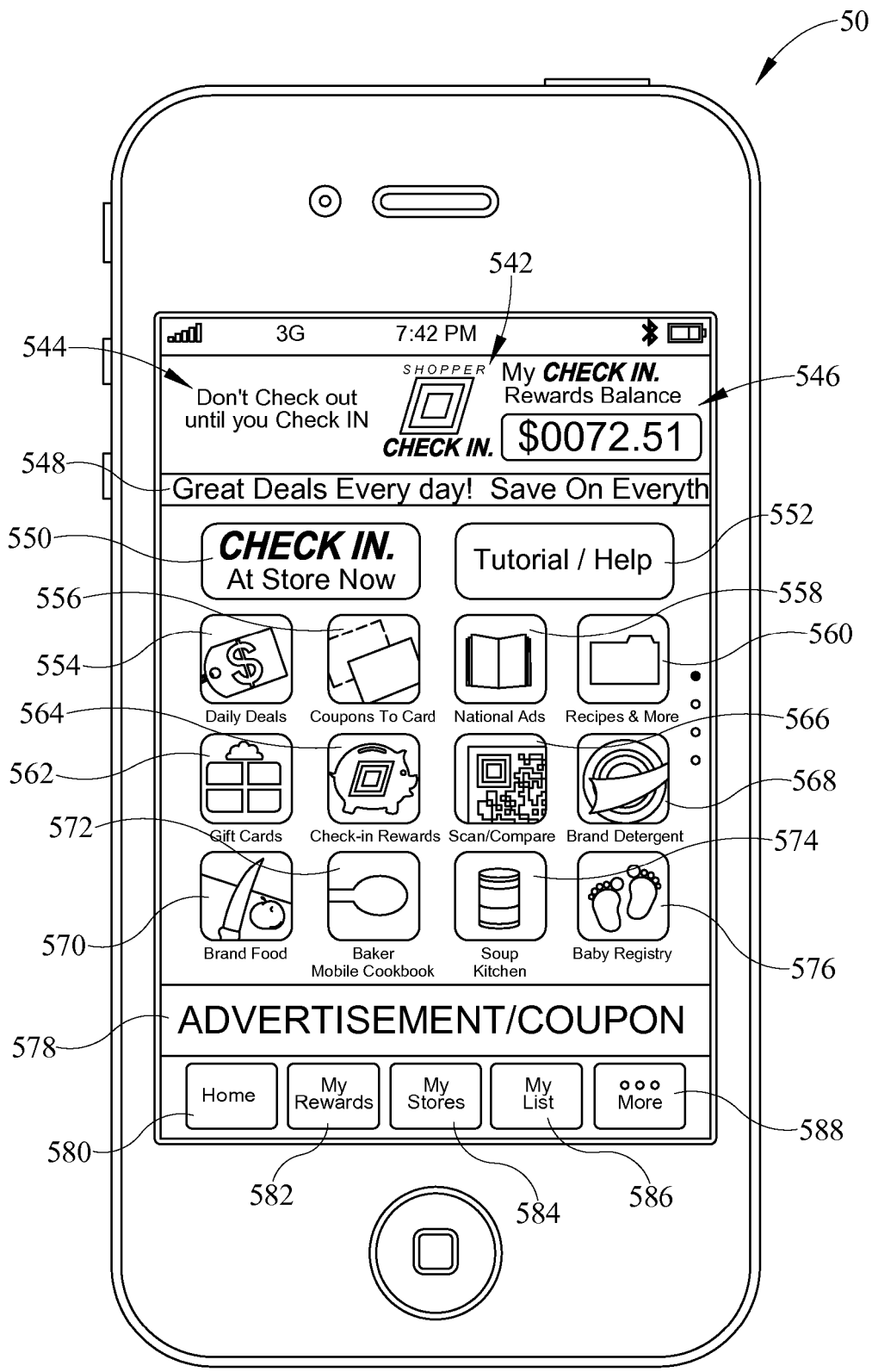
FIG. 2 illustrates the mobile electronic device displaying a home screen of an embodiment of an application for checking-in to a physical store.

Referring now to FIGS. 2-6, the mobile electronic device 50 is illustrated displaying various screens of an embodiment of an application for checking-in to a physical store. FIG. 2 illustrates a home screen of the embodiment of an application for checking-in to a physical store. The home screen includes an application logo 542 ("CHECK-IN") and application slogan 544 ("Don't check out until you Check-in"). The home screen also includes a check-in rewards bar 546 that displays the shopper's current balance of check-in rewards. The balance of check-in rewards is in cash in various embodiments depicted herein. However, as described in detail herein, other pecuniary check-in rewards may be utilized such as, for example, points that may be redeemed for pecuniary savings, coupons that may be redeemed for pecuniary savings, and/or gift certificates that may be redeemed for pecuniary savings. The pecuniary check-in rewards may be provided in such alternative formats initially or after conversion from cash or other format by a shopper.

Located below the application logo 542 and the application slogan 544 is a ticker area 548 that may display textual information as desired. For example, the ticker area 548 may display scrolling text that highlights new features of the application, may display scrolling text that highlights merchants that interface with the application, and/or may display scrolling text highlighting features of the application. The ticker area 548 may optionally be clickable by a user to display additional information. For example, clicking the ticker area 548 may direct the mobile phone 50 to a web page containing additional information pertinent to the textual information displayed in the ticker area 548. In some embodiments the ticker area 548 may display an advertisement or other paid-for material.

Figure 3:
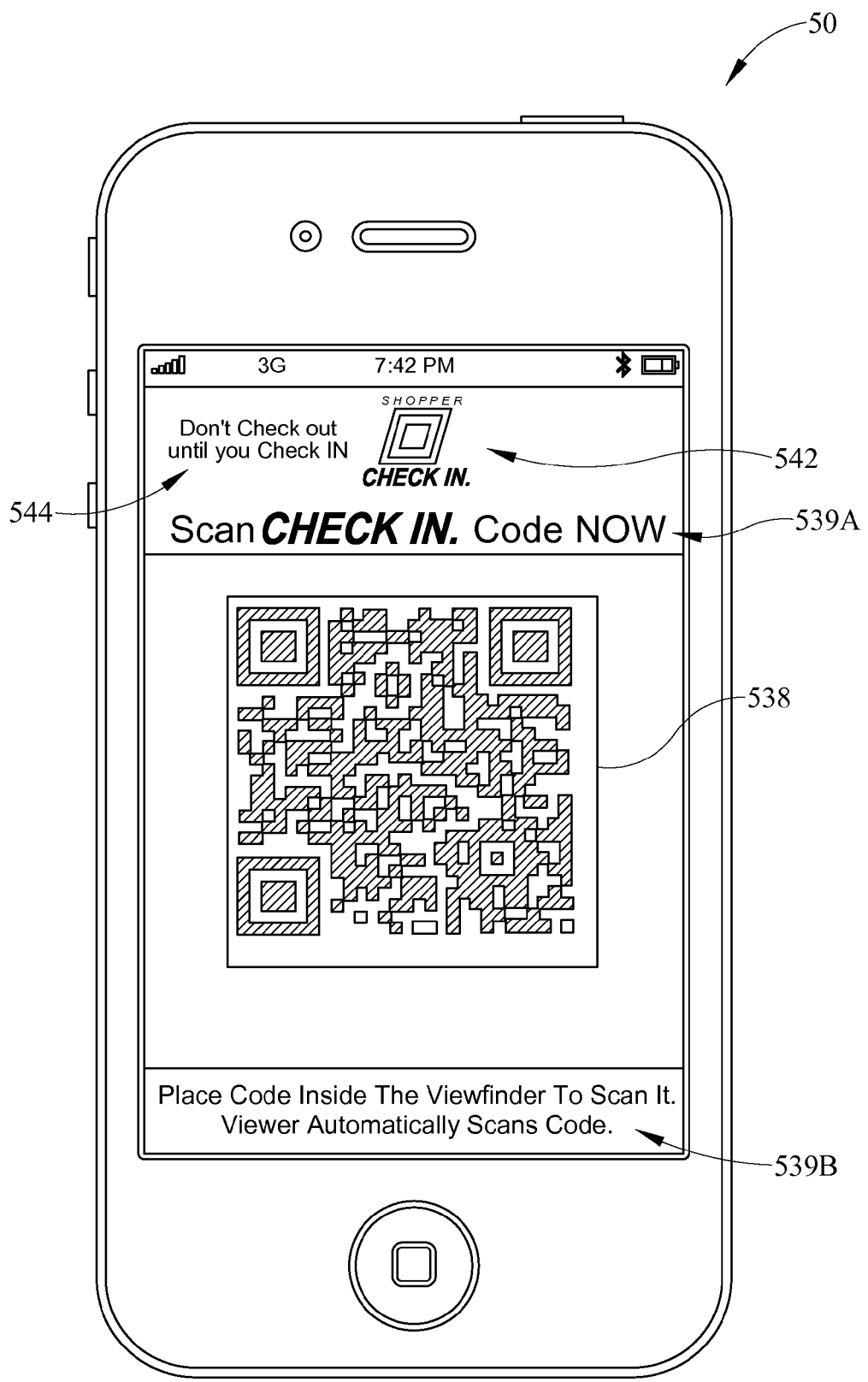
FIG. 3 illustrates the mobile electronic device displaying a check-in screen of the embodiment of the application for checking-in to a physical store.

Located below the ticker area 548 is a check-in button 550 that, when actuated by a shopper, will enable the shopper to check-in to a store as described in detail herein. For example, the check-in button 550 may direct the mobile phone 50 to a check-in screen such as the embodiment of the check-in screen of FIG. 3. Referring to FIG. 3, an image 538 of the check-in barcode 38 is visible in a viewfinder area of the screen of the mobile phone 50. The image 538 may be visible when a shopper is holding the mobile phone 50 such that a camera thereof has the check-in barcode 38 in its field of view at a sufficiently close distance to capture and/or read contents thereof. The image 538 may optionally remain visible for an amount of time to provide the shopper with verification that the check-in barcode 38 was scanned by the mobile phone 50. Instructions 539A and 539B are provided above and below, respectively, the viewfinder area of the mobile phone 50 and instruct the shopper how to scan the check-in barcode 38. Optionally, video, images, and/or audio may be provided in the viewfinder area and/or elsewhere on the screen or from the mobile phone 50 to additionally or alternatively instruct the shopper how to scan the check-in barcode 38.

Figure 4:
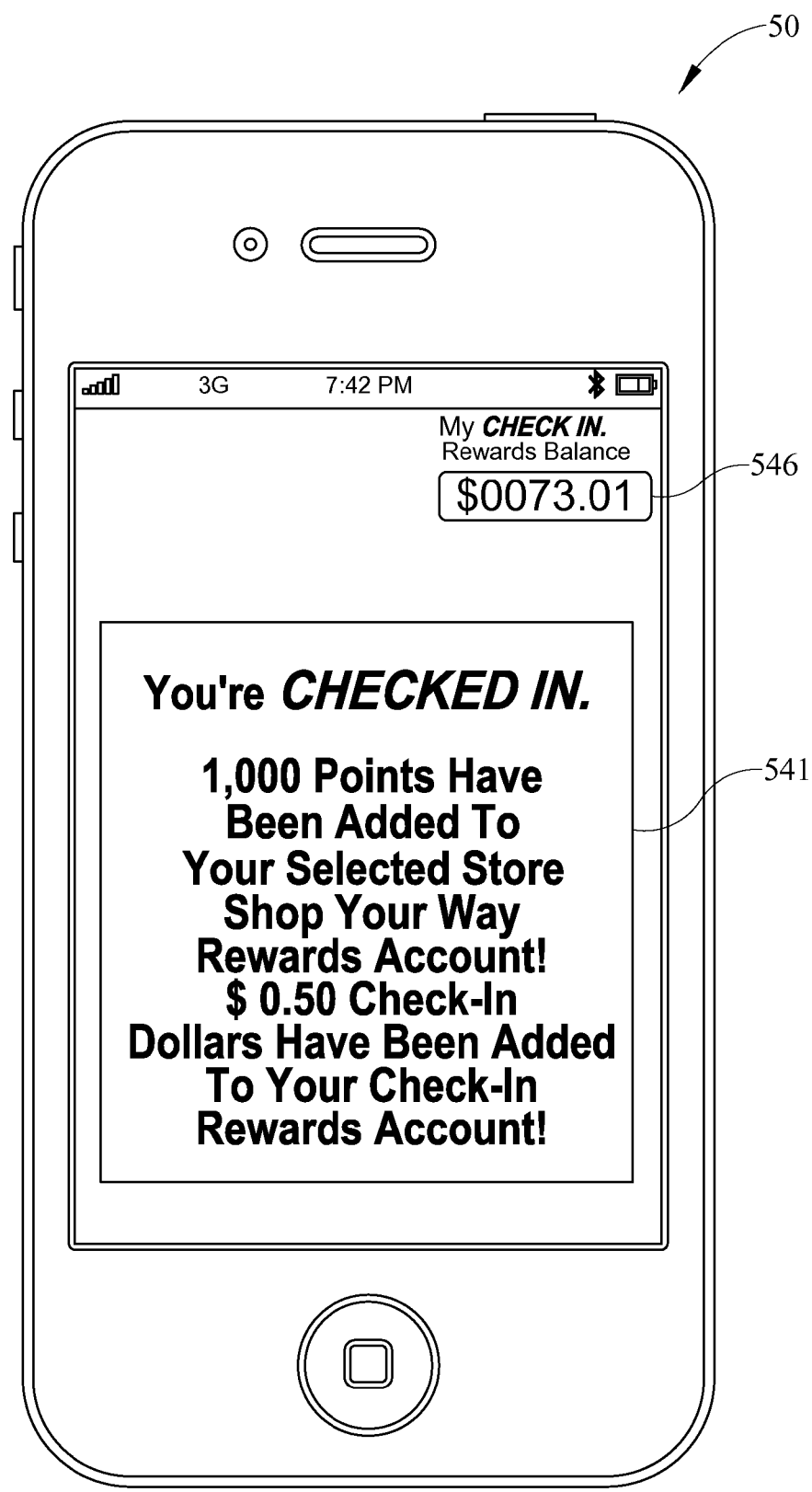
FIG. 4 illustrates a reward notification screen of the embodiment of the application for checking-in to a physical store.

Referring to FIG. 4, once the shopper has utilized the mobile phone 50 to scan the check-in barcode 38, a reward notification screen 541 may be displayed to the shopper. The reward notification screen 541 notifies the shopper of the application of a shopper's account check-in reward to the shopper rewards account of the shopper. The depicted notification screen 541 notifies the shopper that 1,000 points have been applied to a shopper rewards account of the shopper. The shopper rewards account may be a rewards account associated with the store that the shopper checked-in to or, alternatively, may be another store that the shopper has selected. For example, a store may provide shopper's account check-in reward points to a shopper when that shopper checks-in to that store. The store may optionally additionally provide shopper's account check-in rewards points to a shopper when that shopper checks-in to an affiliated store.

The reward notification screen 541 also notifies the shopper of the application of a pecuniary check-in reward to the shopper's check-in rewards account and the amount of the reward ($0.50). The reward notification screen 541 may be in the form of a pop-up type screen displayed for a period of time or until recognized by a user and/or a new screen that is displayed for a period of time or until recognized by a user. Optionally, the reward notification screen 541 may be two separate screens (simultaneously or separately displayed) that may separately display the pecuniary check-in reward and the shopper's account check-in reward. Also, as discussed herein, in certain embodiments of the application and/or when checking-in to certain stores, only the pecuniary check-in rewards may be earned. For example, only pecuniary check-in rewards may be earned when the store does not have a shopper rewards program or when the shopper is not registered with the store's shopper rewards program.

Alternatively, a reward notification may, for example, be displayed in the ticker area 548 or may be otherwise displayed to a user substantially instantaneously following scanning of the check-in barcode 38. For example, the pecuniary rewards notification screen 546 may be updated upon the scanning of the check-in barcode 38, to thereby notify the shopper that a pecuniary check-in reward has been applied to a pecuniary check-in reward account of the user.

For example, the pecuniary check-in rewards notification screen 546 indicates a balance of $73.01. The shopper may look at the balance and compare it to the previous known balance of $72.51 to ascertain the amount of the pecuniary check-in reward applied by scanning of the check-in barcode 38. Alternatively, the check-in rewards bar 546 may separately display (temporarily or permanently) the amount of the most recently applied pecuniary check-in reward and/or a user may actuate the check-in rewards bar 546 to view a listing of the amount of one or more recent applied pecuniary check-in reward(s). Audio and/or video generated on the mobile phone 50 may additionally and/or alternatively notify the shopper of the application and/or amount of the pecuniary check-in reward and/or of the shopper's account check-in reward.

Optionally, the application may interface with one or more social networking applications such as, for example FACEBOOK, TWITTER, and/or other social networking application. For example, upon checking-in to a store utilizing a mobile electronic device to scan a check-in barcode 38, a user may be presented with the option to post a status update or other update to their social networking account notifying other users that they have checked-in to a particular store. Optionally, the update may provide information concerning the amount of the pecuniary check-in reward that was received for checking-in and/or how the pecuniary check-in reward was applied (e.g., a percentage applied to help a charity). Optionally, the application may be configured to interface with and automatically post updates to one or more social networking applications without manual prompting by a shopper.

The application may also interface with one or more social networking applications to enable a shopper to share product reviews, share details regarding sales, and/or share information concerning further pecuniary rewards. A shopper may share such information or other information with all social networking friends or optionally share information only with friends from a selected group. For example, a shopper may share only with: friends only from a selected social networking application; friends who are also users of the application; friends who belong to a shoppers group; etc.

As described in detail herein, in some embodiments the shopper may choose to apply pecuniary check-in rewards in one or more of a variety of different ways. For example, in some embodiments the shopper may choose to apply pecuniary check-in rewards partially to charity and partially to a shopper rewards card. Also, for example, in some embodiments the shopper may choose to receive all pecuniary check-in rewards as cash and receive a portion of the cash and donate another portion of the cash to a friend.

Referring again to FIG. 2, a tutorial/help button 552 is adjacent the check-in button 550 and, when actuated by a shopper, will display content that assists a shopper in utilizing the application. For example, content such as text, images, audio, and/or video may be provided that instructs a shopper how to utilize the check-in feature, how to link shopper information to the application, how to link a shopper's rewards card(s) to the application, and/or how to utilize other features of the application. The deals may optionally be tailored to correspond with stores the shopper has previously checked-in to and/or that are related to such stores.

A matrix of icons 554-576 are provided below the check-in button 550 and the tutorial/help button 552. A daily deals icon 554, when actuated, may provide information concerning promotions, coupons, or other deal related information pertaining to one or more stores and/or one or more products. For example, clicking on the daily deals icon 554 may direct the mobile phone 50 to a web page containing a listing of the most popular deals for the day from a variety of retail stores. For example, the web page may be a forum that contains discussion regarding popular deals as posted and voted on by a variety of users. Also, for example, the web page may be a generated listing of editor selected top daily deals from retail stores that interface with the application.

A coupons to card icon 556, when actuated, may provide the ability to peruse manufacturer coupons, select one or more coupons of interest, and load those coupons to a shopper rewards card for future use. For example, clicking on the coupons to card icon 556 may direct the mobile phone 50 to a listing of active coupons by category, manufacturer, and/or store and enable the shopper to load those coupons to a shopper rewards card, to multiple shopper rewards cards, and/or to the application for future use. In some embodiments, the coupons to card icon 556 may direct the mobile phone 50 to display a screen similar to the electronic advertisement screen 765 shown in FIG. 19 and described herein. A national ads icon 558, when actuated, may provide a listing of national ads of various stores and provide a shopper the ability to peruse a selection of the national ads as desired. A user may be able to select items within a given ad to thereby add such items to a shopping list feature of the application. In some embodiments, the national ads icon 558 may direct the mobile phone 50 to display a screen similar to the electronic advertisement screen 731 in FIG. 18 and described herein. Items may also be added to the shopping list feature by scanning a barcode of the item (e.g., before discarding an empty item). For example, a shopper may actuate the scan item icon 690 in FIG. 17 which, when actuated, may display a screen similar to the barcode scanning screen 775 in FIG. 20 and described herein. A recipes icon 560, when actuated, may provide access to one or more recipes. For example, clicking on the recipes icon 560 may provide access to a web site that enables perusal of recipes by ingredient, by brand, by popularity, etc. If a user likes a given recipe they may be able to add one or more of the recipe ingredients to the shopping list feature of the application. For example, the recipes icon 560, when actuated, may display a screen similar to the electronic recipe screen 796 in FIG. 21 and described herein. The shopper may add one or more recipe ingredients 785 to the shopping list feature when the add to list icon is actuated. Also, the application may determine if any of the ingredients of the recipe have an active coupon and, if so, add the coupon to the pertinent (e.g., as selected by a user and/or of the store the shopper is in) shopper rewards card of the shopper.

A gift cards icon 562, when actuated, may provide the ability to purchase a gift card for one or more stores. For example, clicking on the gift cards icon 562 may direct the mobile phone 50 to a listing of stores and enable a user to purchase a desired denomination of gift card to that store. Optionally, the gift card may be loaded to the application for use and/or may be loaded to a shopper rewards card associated with a selected store. In some embodiments the gift card may be loaded to the application of another shopper (e.g., to a friend as a gift) and/or another shopper's shopper rewards card. Also, in some embodiments, the gift card may be purchased, in whole or in part, utilizing earned pecuniary check-in rewards and/or further pecuniary rewards described herein.

A check-in rewards icon 564, when actuated, may provide additional information related to earned check-in rewards. For example, when actuated, the check-in rewards icon 564 may direct the mobile phone 50 to one or more screens that include information related to a shopper's check-in rewards history, current check-in rewards offered by various stores, a listing of stores participating in check-in rewards, a shopper's current check-in rewards utilization settings, tying a shopper's account check-in rewards into one or more shopper's rewards cards, tying pecuniary check-in rewards into a bank account, providing demographic information for utilization in applying and/or utilizing the check-in rewards, utilizing check-in rewards, etc.

Figure 6:
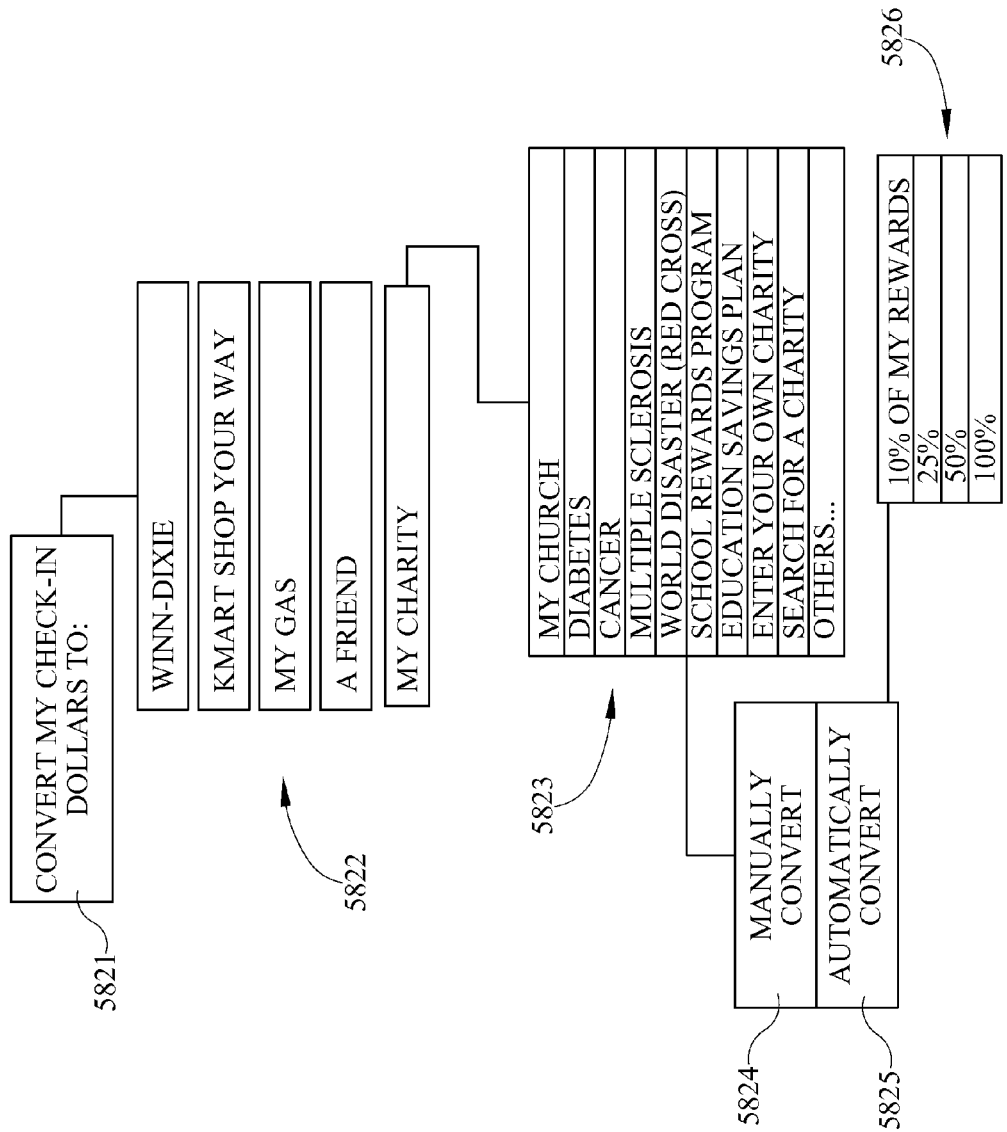
FIG. 6 illustrates a pecuniary check-in reward utilization screen of the embodiment of the application for checking-in to a physical store.

Referring to FIG. 6, a pecuniary check-in reward utilization screen of the embodiment of the application for checking-in to a physical store is illustrated. The pecuniary check-in reward utilization screen may be one screen accessible via actuation of the check-in rewards icon 564. Several different buttons (generally indicated at 5821-5826) are displayed in FIG. 6. It is understood that all buttons 5821-5826 may not be displayed at once and that certain buttons 5822-5826 may not be displayed until certain other precursor buttons 5821-5825 are actuated.

Actuation of the check-in dollars conversion button 5821 displays a list of conversion options 5822. The options include "Winn-Dixie," "Kmart Shop Your Way," "My Gas," "A Friend," and "My Charity." Selection of Winn-Dixie or Kmart Shop Your Way will enable the shopper to manually or automatically convert all or a portion of the pecuniary check-in dollars to points, coupons, or other pecuniary interest in respective shoppers rewards cards of Winn-Dixie and Kmart. For example, the shopper may choose to automatically convert 100% of the check-in dollars to points on a shopper's rewards card and, upon checking-in to a store, pecuniary check-in rewards may be converted to such points. The conversion of the pecuniary check-in rewards may be in addition to the separate shopper's account check-in rewards rewarded by the store's shopper rewards program upon checking-in. Also, for example, the shopper may choose to periodically manually convert pecuniary check-in dollars to shopper rewards points and, upon checking-in to a store, receive check-in dollars that may later be converted to shoppers rewards points. The shopper may be prompted to supply information concerning the respective shoppers rewards cards so that the application may appropriately apply the check-in dollars, so that the shopper may appropriately check-in to a store, and/or so that shopper's account check-in rewards may be applied. For example, the shopper may be prompted to enter demographic data, data on their shopper rewards card, and/or scan their shopper rewards card utilizing the mobile phone 50.

Selection of My Gas will enable the shopper to manually or automatically convert all or a portion of the check-in dollars to points, coupons, or other pecuniary interest that may be utilized at one or more gas stations. Optionally, the pecuniary interest may be loaded onto a shopper's rewards card associated with the gas station. Alternatively or additionally, the pecuniary interest may be mailed or electronically sent (e.g., via the mobile phone 50) to a shopper in the form of coupons, points, gift cards, etc. The shopper may be prompted to supply information concerning the respective shoppers rewards cards, desired gas station, etc. so that the application may appropriately apply the check-in dollars.

Selection of A Friend will enable the shopper to manually or automatically convert all or a portion of the check-in dollars to a desired non-charitable third party. Optionally, the pecuniary interest may be loaded onto a third party's shopper rewards card associated with a store. Alternatively or additionally, the pecuniary interest may be applied to a third party's check-in dollars for utilization by the third party as desired. Alternatively, the pecuniary interest may be mailed or electronically sent (e.g., via e-mail, via EFT, via a social networking application) to a third party in the form of coupons, points, gift cards, cash, check, etc. The shopper may be prompted to supply information concerning the third parties so that the application may appropriately apply the check-in dollars.

Selection of My Charity, displays a listing of charities 5823. The charities may be automatically populated, populated based on selections by a user (e.g., searching a database of charities), and/or populated based on demographic or other data of a user. Optionally, for an unrecognized charity, the shopper may be prompted for additional information concerning the charity (e.g., the charity's name, address, tax ID number). Also, a shopper may be prompted to enter information to be eligible for a tax deduction (e.g., shopper's name, address, tax ID number) so that a receipt may be sent to the shopper.

Selection of a particular charity from the listing of charities 5823 may provide the shopper with the option to manually convert check-in dollars 5824 or automatically convert check-in dollars 5825. Manually converting check-in dollars 5824 enables a shopper to select a desired amount of earned check-in dollars (e.g., a specific dollar amount or a specific percentage) to apply to a selected charity on a one-time basis. Automatically converting check-in dollars 5825 enables a shopper to select a percentage (e.g., percentages 5826 or a manually entered percentage) of earned check-in dollars to automatically apply to a selected charity. The shopper may choose to apply all previously earned check-in dollars and check-in dollars going forward, or just check-in dollars going forward.

Although particular check-in dollar conversion options are depicted in FIG. 6, one of ordinary skill in the art, having had the benefit of the present disclosure, will recognize and appreciate that in alternative embodiments additional and/or alternative check-in dollar conversion options may be provided. For example, in some embodiments a cash-out check-in dollar conversion option may be provided. A shopper may choose to have check-in dollars applied directly to an entered bank account (their own or a third parties') or to have a check mailed to them. The check-in dollars may convert to actual cash on a one to one basis in some embodiments or, in alternative embodiments, optionally convert on an alternative basis. Also, for example, in some embodiments a shopper may choose to convert check-in dollars earned in selected stores to certain rewards cards, third parties, etc. and convert check-in dollars earned in selected other stores to other rewards cards, third parties, etc. For example, check-in dollars earned in a given store may optionally be worth more if converted to that store's rewards card than if converted to another store's rewards card.

Referring again to FIG. 2, a scan/compare icon 566 is provided that, when actuated, may provide the ability to scan a barcode of an item within a store and locate additional information concerning the item. For example, clicking on the scan/compare icon 566 may enable the mobile phone 50 to scan an item and, upon scanning of the item, provide a listing of other stores that have the item and the price of the item at other stores. Also, for example, upon scanning of an item, competing products in the store may be displayed (e.g., generic brands) and optionally, information concerning those competing products (e.g., price, features).

A brand detergent icon 568 is also provided that, when actuated, may provide a user with instructions concerning treating stains utilizing a certain brand of detergent. A food icon 570 is also provided that, when actuated, may provide a user with information (e.g., specials, nutritional information) concerning foods from a certain manufacturer. A mobile cookbook icon 572 is also provided that, when actuated, may provide a user with recipes that utilize one or more products from a particular manufacturer. A kitchen icon 574 is also provided that, when actuated, may provide a user with recipes and/or other information concerning products from a particular manufacturer. Optionally, the detergent icon 568, the food icon 570, the mobile cookbook icon 572, and/or the kitchen icon 574 may be sponsored by one or more manufacturers. Optionally, revenue from the sponsorship(s) may be utilized in one or more of the pecuniary rewards described herein.

A baby registry icon 567 is also provided that, when actuated, may enable a shopper to view products from another shopper's baby registry and/or edit their own registry. The baby registry icon 567 may optionally be tied into a registry at a particular store, may combine registries from a plurality of stores, and/or may serve as a standalone registry. The baby registry icon 567 may enable a user to scan an item's barcode utilizing the mobile phone 50 to add/remove that item from their registry and/or to notify another registry that they are purchasing an item on that registry.

An advertisement/coupon banner 578 is provided below the icons 554-576. The banner 578 may display one or more sponsored advertisements. Optionally, a shopper may click the banner 578 to obtain additional information regarding the advertisement. For example, the shopper may click the banner 578 to be redirected to a website to purchase the product being advertised.

Provided below the banner 578 are additional buttons 580-588. The Home button 580, when actuated, may direct the shopper to the home screen depicted in FIG. 2 (for example, when the shopper has navigated to another screen). The My Rewards button 582, when actuated, may direct the shopper to a screen that provides details concerning earned rewards. Optionally, the screen may contain information concerning earned pecuniary check-in rewards described in detail herein in addition to further pecuniary or other rewards that may be earned by a shopper, as described in detail herein. The My Stores button 584, when actuated, may direct the shopper to a screen that provides details concerning stores that the shopper has visited and/or has listed as favorite stores. For example, the screen may provide details on specials at selected stores, current check-in rewards offered at selected stores, etc. The My List button 586, when actuated, may direct the shopper to a screen that provide details concerning user generated lists such as, for example, shopping lists described herein, to do lists, etc. The My List button 586 may direct the shopper to an electronic shopping list screen which may share one or more characteristics with the annotated electronic shopping list screen illustrated in FIG. 23 and described herein. The More button 588, when actuated, provides access to additional icons and/or buttons having additional functionality.

Figure 5:
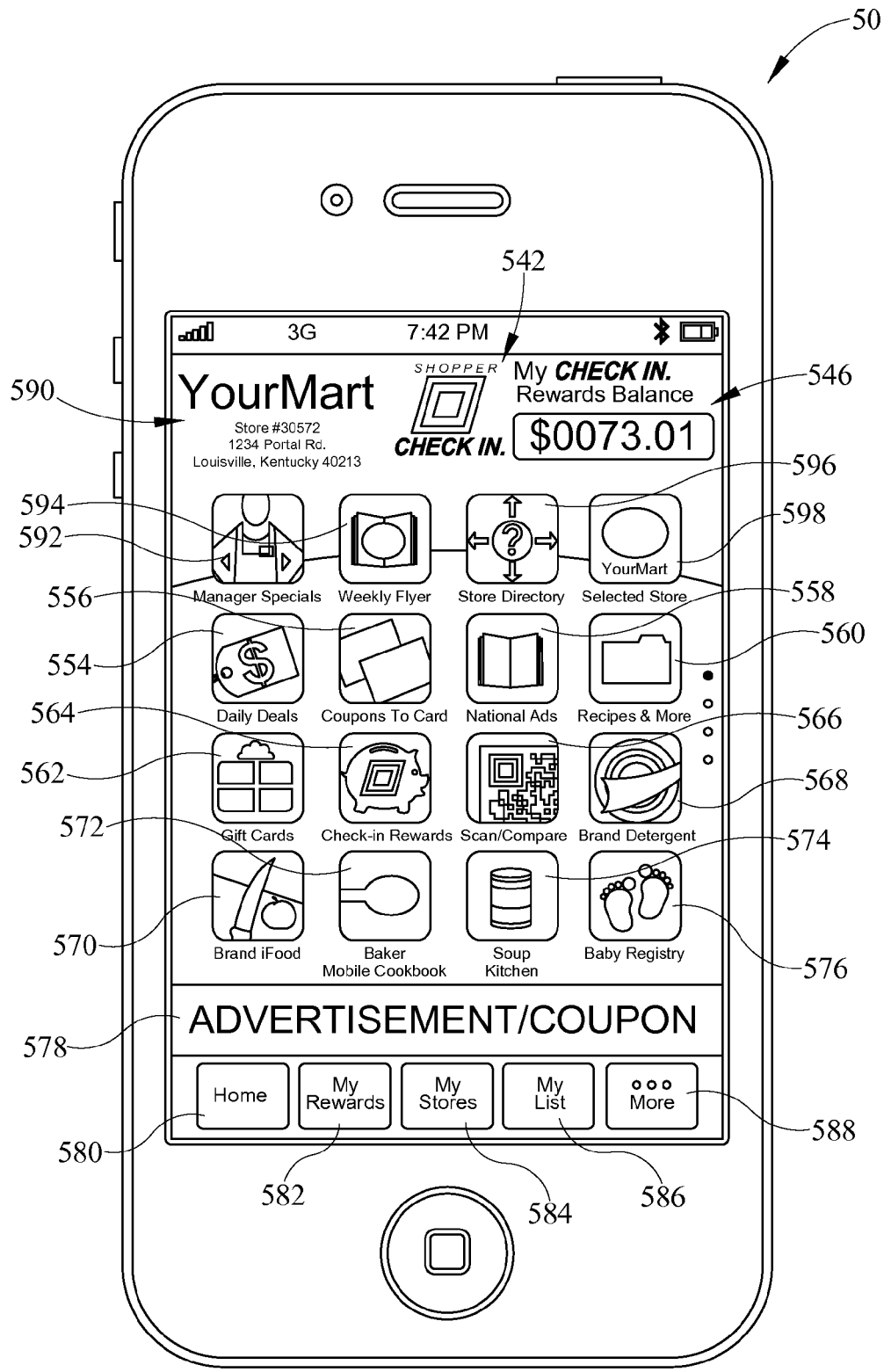
FIG. 5 illustrates a physical store home screen of the embodiment of the application for checking-in to a physical store.

Referring now to FIG. 5, a physical store home screen of the embodiment of the application for checking-in to a physical store is depicted. The store home screen is optionally displayed after the user has checked-in to a given physical store. The store home screen contains many of the same icons and buttons as the home screen, but also includes store specific information 590 and store specific icons 592-598. The store specific information 590 provides the name of the store that the shopper has checked-in to, in addition to the store number and address. The store specific icons 592-598 include a manager specials icon 592, a weekly flyer icon 594, a store directory icon 596, and a selected store icon 598. The manager specials icon 592, when actuated, may list specials that may be in addition to regular specials such as, for example, specials dictated by a manager due to over ordering. Also, for example, the manager specials icon 592 may include specials that are provide to selected shoppers only such as, for example, shoppers that: are frequent shoppers to the store; new shoppers to the store; typically shop at a competing store; have certain attributes; etc., as determined by, for example, the application, store rewards program(s) interfacing with the application, marketing service(s) interfacing with the application, and/or supplied demographic information. For example, the application may determine that the shopper typically shops at grocery store A and, if the shopper checks-in to grocery store B, may offer the shopper additional specials to grocery store B.

The weekly flyer icon 594, when actuated, provides a link to the weekly (or other period) flyer that contains the store's current specials. Optionally, the flyer may be tailored to the particular shopper. For example, the first pages of the flyer may display items that may interest the shopper more than items on the latter pages of the flyer. A shopper's interest may be determined by, for example, the application, store rewards program(s), marketing services, and/or supplied demographic information. Also, for example, the flyer may be tailored based on the shopping list feature. For example, the weekly flyer may display products and/or items on the electronic shopping list, competing products, complimentary product and/or items (e.g., milk and cereal), and/or items which are of the same or similar type of product to one or more items that are on the shopping list but of a different brand. The store directory icon 596, when actuated, provides a link to a map of the store and/or to an optionally searchable index of the store to assist a shopper in locating particular items. Optionally, the store directory icon 596 may be tailored to the particular shopper. For example, the location of certain items that may interest the shopper may be highlighted in the store directory. The selected store icon 598, when actuated, may link to information pertaining to the checked-in store. For example, store hours, store features, current store check-in rewards, and/or current further pecuniary rewards may be provided upon actuation of the selected store icon 598.

One or more of the icons and buttons 554-598 described herein may direct a user to a web page or other content that contains paid-for material. For example, placement of coupons when the coupons to card icon 556 is selected, may be dictated at least in part by whether a manufacturer has paid for premium placement. Also, for example, the listing of available gift cards may be dependent, at least in part, by whether a manufacturer has paid for placement in the listing. Also, for example, icons 568-576, ticker 548, and banner 578 may optionally contain paid-for material. The check-in dollars that are applied to a shopper's check-in rewards may optionally be derived from such paid-for material and/or from one or more of a variety of other sources. For example, the check-in dollars may additionally or alternatively be derived from a participation fee derived from stores for enabling the stores to interface with the check-in rewards application. Optionally, the check-in dollars that are applied to a shopper's check-in rewards may be a fixed percentage (optionally with a cap) of revenue derived from certain sources.

One or more of the icons 554-598 described herein may direct a user to a web page or other content that is at least partially tailored to a shopper. For example, information displayed upon actuation of the daily deals icon 554 may be based at least in part on the purchasing history of the shopper, demographics of the shopper, and/or the electronic shopping list of the shopper. Also, one or more of the icons 554-598 may be based at least in part tailored to a particular shopper and tailored to the store that the shopper has checked-in to. For example, one or more of the icons may be tailored to a shopper based on his demographics and/or shopping history (as determined by the application, from one or more interfacing shoppers rewards programs, and/or information from one or more shopper marketing companies) and may also be tailored to the store that the shopper has checked-in to. For example, the coupons to card icon 556 may be tailored to include only items that are within the store that the shopper has checked-in to and to include only items that compete with items the shopper has previously purchased. Also, for example, the coupons to card icon 556 may be tailored to include only items that are on the electronic shopping list of the shopper.

Although particular icons are depicted and described herein, one of ordinary skill in the art, having had the benefit of the present disclosure, will recognize and appreciate that in alternative embodiments one or more of the icons may be replaced with other icons, buttons, and/or links. For example, other icons such as a health icon that displays health information concerning foods, a pharmacy icon that displays information pertaining to a store's pharmacy, a wedding registry icon, a social networking icon that provides access to a social networking application and/or one or more social networking features, and/or a product recall icon that displays information pertaining to product recalls (optionally, based upon a shopper's purchase history) may additionally or alternatively be provided. The particular icons that are displayed may optionally be partially or wholly dictated by a user. Moreover, actuation of the depicted or alternative icons by a shopper may result in additional and/or alternative functionality than described herein.

Figure 7:
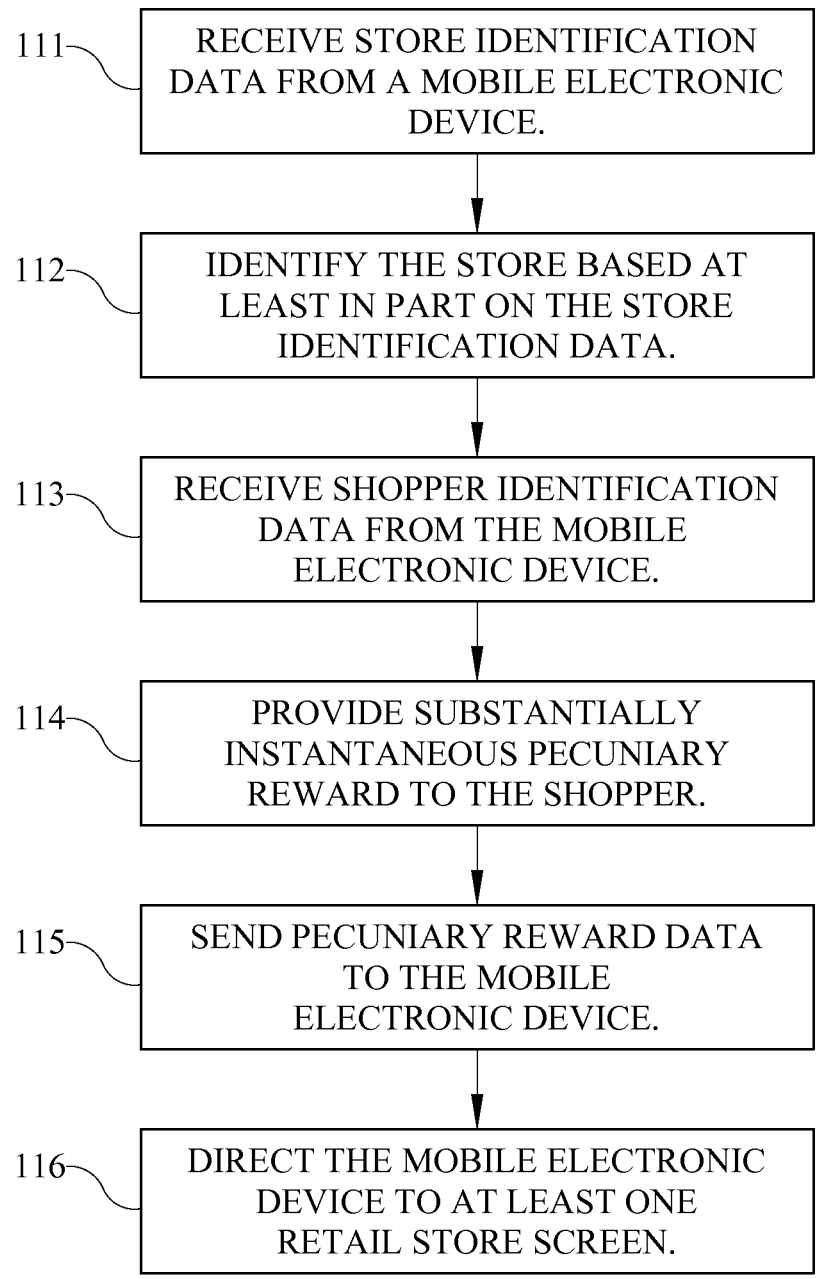
FIG. 7 illustrates a flowchart of an embodiment of providing a substantially instantaneous pecuniary reward to a mobile electronic device.

Referring now to FIG. 7, a flowchart of an embodiment of providing a substantially instantaneous pecuniary reward to a mobile electronic device is illustrated. At step 111 store identification data from a mobile electronic device such as, for example, mobile phone 50, a tablet computer, or PDA is received. The store identification data is encoded in the check-in barcode of the store that was scanned by the mobile electronic device. In some embodiments software on the mobile electronic device decodes the check-in barcode and supplies store identification data contained therein. In other embodiments the mobile electronic device may provide an image of the check-in barcode and store identification data contained therein is decoded therefrom.

At step 112, the store is identified based at least in part on the received store identification data. In some embodiments the store is identified based wholly on store identification data. In other embodiments the store may be identified based on store identification data and geolocation data. Geolocation data includes electronic data supplied by the mobile electronic device that indicates (directly or indirectly) the location thereof such as GPS data, cell phone tower data, and/or IP address data. The geolocation data may be utilized to verify that the shopper is actually at a store (e.g, to verify that the shopper is not scanning a copied check-in barcode). In some embodiments the check-in barcode at a store may be periodically changed at the store (and updated in the database) to minimize copying of check-in barcodes. The geolocation data may additionally or alternatively be utilized to help narrow which store a user is at out of a plurality of stores indicated in the store identification data. For example, the store identification data may indicate a Winn-Dixie, but not specify the location. The geolocation data may be utilized to ascertain the exact location.

At step 113, shopper identification data is received from the mobile electronic device. The shopper identification data may include, for example, one or more shopper rewards numbers, demographic data supplied by the user, and/or an internal shopper identification number utilized to identify a user of the application. For example, each user of the application described herein may be referenced with an internal shopper identification number to identify the user. The shopper identification number may be sent by the mobile electronic device. Also, for example, each user of the application described herein may be referenced with an identifying number of the mobile electronic device (e.g., phone number, SIM number, or other identifier) that may be sent by the mobile electronic device.

At step 114, a substantially instantaneous pecuniary check-in reward is provided to the shopper. For example, a pecuniary check-in reward is credited to the check-in rewards account. The pecuniary check-in reward may be standard or may be based on one or more factors. For example, the reward may be based on which store the shopper checked-in to, how many times the user has checked-in to the store, what other stores the shopper has checked-in to, the purchasing history of the shopper, how many times the shopper has checked-in to other stores, and/or demographics information of the shopper. As discussed herein, a separate shopper's account check-in reward may also optionally be applied and credited to the shopper's shopper rewards account. The shopper's account check-in reward may be standard or may be based on one or more factors such as, for example, which store the shopper checked-in to, how many times the user has checked-in to the store, what other stores the shopper has checked-in to, the purchasing history of the shopper, how many times the shopper has checked-in to other stores, whether a shopper is sharing an electronic shopping list via a mobile electronic device, and/or demographics information of the shopper.

At step 115, pecuniary check-in reward data is sent to the mobile electronic device. The pecuniary check-in reward data may include data that enables the mobile electronic device to notify the shopper that a pecuniary check-in reward has been applied to the shopper's account. Optionally, detailed information regarding the amount of the pecuniary check-in reward may also be provided. Also, optionally, the shopper may be provided with additional pecuniary check-in reward data such as the total of all pecuniary check-in rewards that the shopper has received and not yet utilized. Separate shopper's account check-in reward data may also optionally be sent to the mobile electronic device that may enable the mobile electronic device to notify the shopper that shopper's account check-in reward points have been credited to the shopper's shopper rewards account.

At step 116, the mobile electronic device is directed to at least one retail store screen that contains data specifically tailored to the specific retail store. Optionally, the retail store screen (or screens accessible therefrom) may additionally contain data specifically tailored to the shopper as described herein. In some embodiments a server may direct the mobile electronic device to a screen and may optionally load data to the mobile electronic device. In other embodiments the mobile electronic device may automatically direct itself to a retail store screen. For example, in some embodiments the check-in barcode may contain a link to a store specific web page and the mobile electronic device may navigate to that page following scanning of the check-in barcode. In some of those embodiments the mobile electronic device may further navigate to a shopper specific page based on, for example, shopper identification data (e.g., shopper rewards number; application account number; mobile phone ID data).

Figure 8:
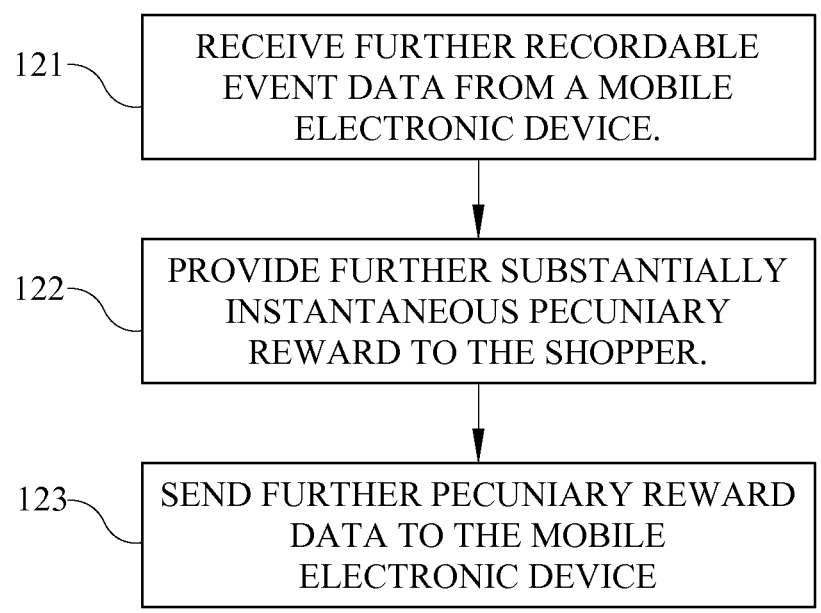
FIG. 8 illustrates a flowchart of an embodiment of providing a substantially instantaneous further pecuniary reward to a mobile electronic device.

Referring now to FIG. 8, a flowchart of an embodiment of providing a substantially instantaneous further pecuniary reward to a mobile electronic device is illustrated. The further pecuniary reward is separate and distinct from the pecuniary check-in reward and is rewarded for an action that occurs after checking-in. The further pecuniary reward may be in the form of cash, vouchers, gift cards, etc. The further pecuniary reward may be kept in an account separate from the pecuniary check-in rewards or may optionally be combined with the pecuniary check-in rewards account.

At step 121, further recordable event data is received from a mobile electronic device or from another device. For example, data that indicates a user has viewed recipes via the mobile cookbook icon 572 may be transmitted by the mobile electronic device and/or by a server hosting the mobile cookbook. Also, for example, data that indicates a user has viewed an advertisement within banner 578 may be transmitted by the mobile electronic device and/or a server hosting the advertisement or link associated with the advertisement. Also, for example, data that indicates a user has selected the coupons to card icon 556, applied a coupon, and purchased a product utilizing the coupon may be communicated from the mobile electronic device or from servers associated with a retail store. Also, for example, data that indicates a user has viewed recipes via the mobile cookbook icon 572 and purchased a product utilized in the recipe may be communicated from the mobile electronic device or from servers associated with a retail store. Also, for example, data that indicates that a user has provided an electronic shopping list may be communicated from the mobile electronic device or from the servers associated with a retail store.

At step 122 a further substantially instantaneous pecuniary reward is provided to the shopper. For example, substantially instantaneously upon receipt of data from the mobile electronic device and/or from another device that indicates the shopper has performed a further recordable action, a further pecuniary reward is credited to the shopper's account. The further pecuniary reward may be standard or may be based on one or more factors. For example, the further pecuniary reward may be based on what the further action was, whether a product was actually purchased, what product (if any) is involved, the purchasing history of the shopper, and/or demographics information of the shopper.

At step 123, further pecuniary reward data is substantially instantaneously sent to the mobile electronic device. The further pecuniary reward data may include data that enables the mobile electronic device to notify the shopper that a further pecuniary reward has been applied to the shopper's account. Optionally, detailed information regarding the amount of the further pecuniary reward may also be provided.

Also, optionally, the shopper may be provided with additional further pecuniary rewards data such as the total of all further pecuniary rewards that the shopper has received and not yet utilized. Also, optionally the shopper may be notified via the mobile electronic device that upon performing a further action, additional further pecuniary rewards may be obtained. For example, upon viewing a recipe via the mobile cookbook icon 572 the shopper may be provided with a further pecuniary reward and notified that if one or more of the items in the recipe is purchased, an additional further pecuniary reward may be obtained.

The earned further pecuniary rewards may optionally be applied in a manner similar to that described with respect to pecuniary check-in rewards. For example, the further pecuniary rewards may optionally be converted from one format to another format (e.g., received in dollars and converted to rewards points). Also, for example, the further pecuniary rewards may optionally be automatically or manually applied to a third party, a charity, a bank account, etc.

Figure 9:
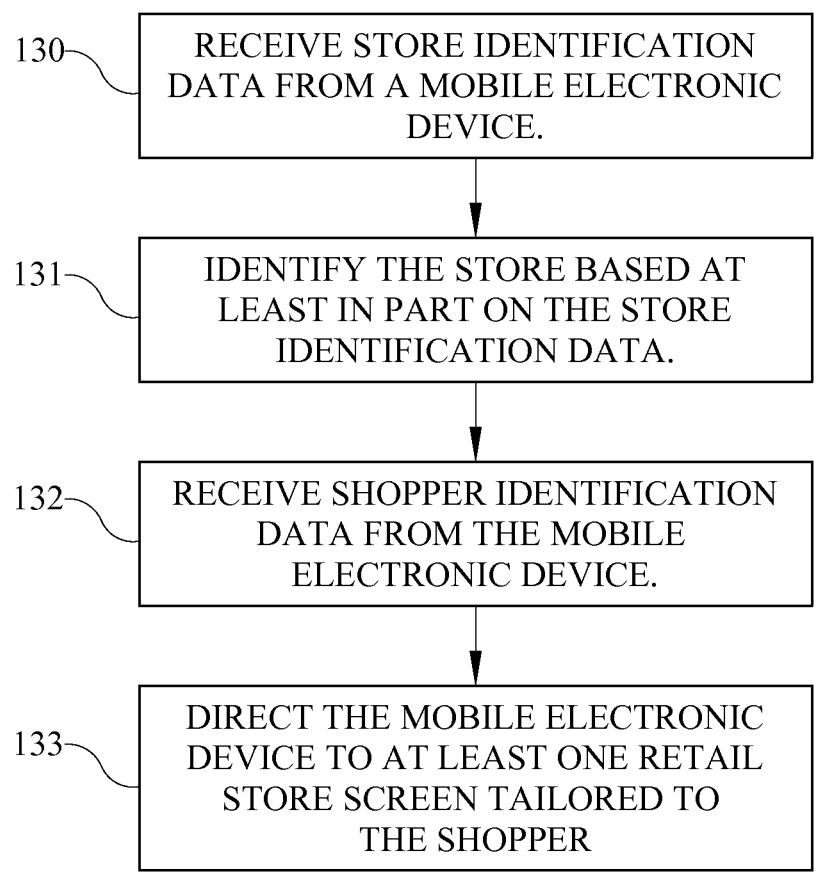
FIG. 9 illustrates a flowchart of an embodiment of providing at least one tailored retail screen to a shopper.

Referring now to FIG. 9, a flowchart of an embodiment of providing at least one tailored retail screen to a shopper is illustrated. At step 130, store identification data is received from a mobile electronic device. The store identification data may be encoded in the check-in barcode of the store that was scanned by the mobile electronic device. In some embodiments software on the mobile electronic device decodes the check-in barcode and supplies store identification data contained therein. In other embodiments the mobile electronic device may provide an image of the check-in barcode and store identification data contained therein is decoded therefrom.

At step 131 the store is identified based at least in part on the received store identification data. In some embodiments the store is identified based wholly on the store identification data. In other embodiments the store may be identified based on the store identification data and geolocation data.

At step 132 shopper identification data is received from the mobile electronic device. The shopper identification data may include, for example, one or more shopper rewards numbers, demographic data supplied by the user, mobile electronic device identification data, and/or an internal shopper identification number utilized to identify a user of the application.

At step 133, the mobile electronic device is directed to at least one retail store screen tailored to the shopper. For example, in some embodiments a shopper may select a store flyer icon within the application that directs the shopper to a store flyer that is specifically arranged based upon shopping habits, demographic data, an electronic shopping list compiled by the shopper and supplied by the mobile electronic device, or other information pertaining to the particular shopper. Also, for example, in some embodiments a shopper may be presented with specific specials based upon shopping habits, demographic data, an electronic shopping list compiled by the shopper and supplied by the mobile electronic device, or other information pertaining to the particular shopper.

Figure 10:
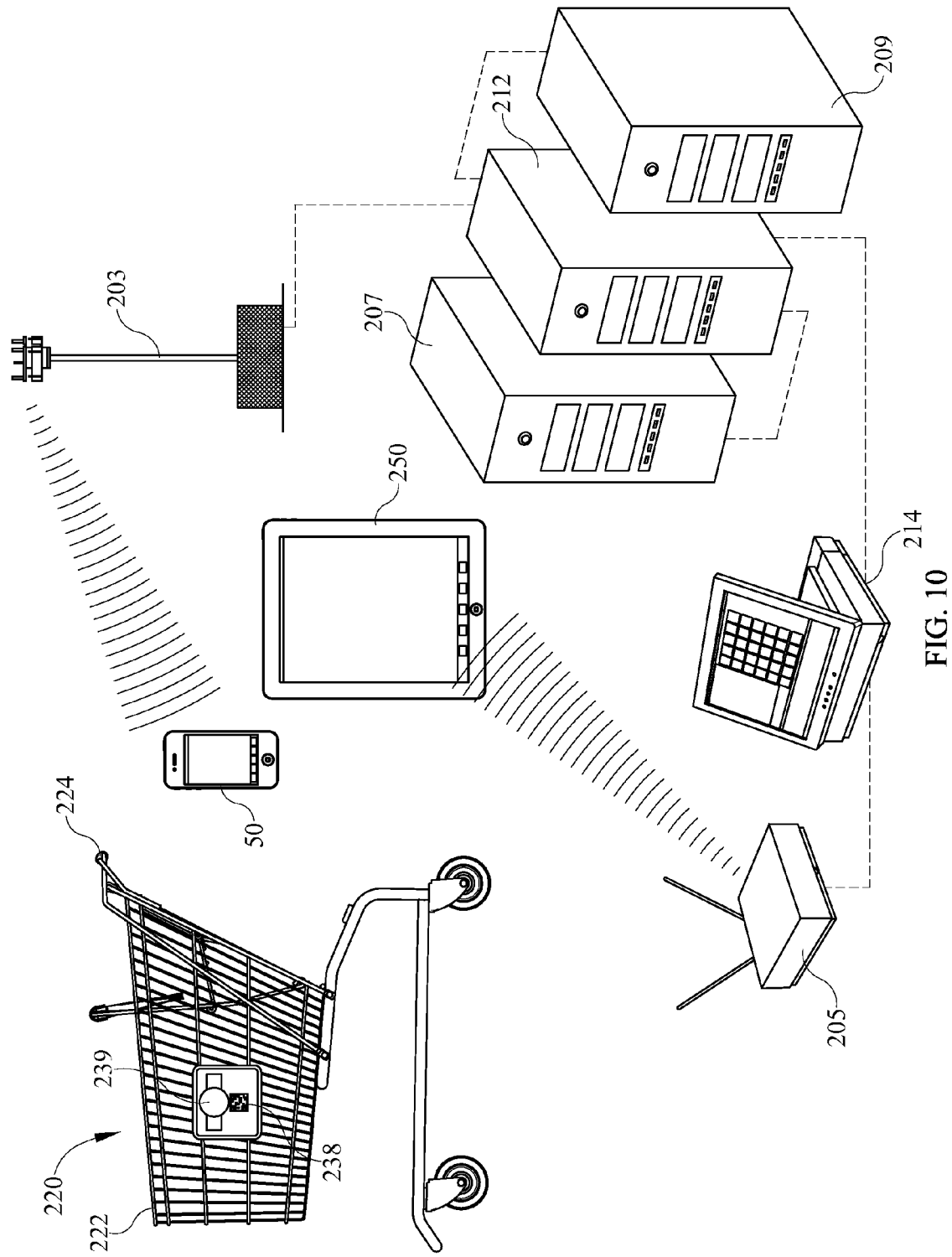
FIG. 10 illustrates an embodiment of a system for checking-in to a physical store.

Referring now to FIG. 10, an embodiment of a system for checking-in to a physical store is illustrated. A shopping cart 220 is illustrated having a basket 222 and a handle 224 extending rearward from the basket 222. A check-in barcode 238 is provided on an insert that is attached to a side of the basket 222. The insert includes instructions 239 related to utilization of the check-in barcode 238. Optionally, the insert is removably attached to the basket 222.

A mobile phone 50 and a tablet computer 250 are depicted in FIG. 10 interacting with the system for checking-in to a physical store. The mobile phone 50 and tablet computer 250 may be utilized to, inter alia, scan the check-in barcode 238. The mobile phone 50 is in network communication with a server 212 of the system via a cell phone tower 203 and data lines (including any associated intermediary switches, servers, etc.) extending between the cell phone tower 203 and server 212. The tablet computer 250 is in network communication with a wireless router 205 that is in communication with a server 212 of the system via an intermediary in-store computer 214 and data lines (including any associated intermediary switches, servers, etc.) extending between the in-store computer 214 and server 212. In alternative embodiments the tablet computer 250 may be in communication with the cell phone tower 203. The in-store computer 214 may be omitted in some embodiments and the router 205 may simply be connected directly to the internet or other network. Also, both the router 205 and the in-store computer 214 may be omitted in some embodiments.

The server 212 may perform one or more of the server side functions described herein. The mobile phone 50 and tablet computer 250 may perform one or more of the mobile electronic device side functions described herein. It is understood that the server 212 may optionally perform one or more mobile phone 50 and tablet computer 250 functions as desired (for example, when the mobile phone 50 and/or tablet computer 250 has limited functionality or when it is desirable to remotely perform some functions) and/or the mobile phone 50 and tablet computer 250 may optionally perform one or more of the functions of the server 212 (for example, when it is desirable to remotely perform some functions of the server 212). Optionally, the in-store computer 214 may be programmed to perform one or more of the functions that might otherwise be performed by the server 212. For example, the in-store computer 214 may be accessed by a user to program and/or deliver one or more aspects of store specific content to a user (via router 205 and/or server 212). For example, the in-store computer 214 may be utilized to deliver one or more manager specials to shoppers that utilize the application described herein via Wi-Fi in the store. Additionally or alternatively, the in-store computer 214 may be utilized to send information to shoppers regarding store mapping and/or locations of products as described herein.

Also depicted in FIG. 10 is a store shopper rewards account server 207 and a marketing server 209 that are each in communication with the server 212. The store shopper rewards account server 207 may contain information pertaining to a store's shopper rewards account. In embodiments where separate shopper's account check-in rewards are provided, the store shopper rewards account server 207 may receive check-in information from server 212 to thereby enable the application of a shopper's account check-in reward to a shopper's shopper rewards account. The store shopper rewards account server 207 may also provide information to server 212 such as, for example, the amount of the shopper's account check-in reward provided to the shopper and/or the shopper's current shopper rewards balance. It is understood that the server 212 may be in communication with multiple shopper rewards account servers 207 that correspond to shopper rewards accounts of different stores.

The marketing server 209 may contain information pertaining to a shopper's purchasing history. For example, the marketing server 209 may include information from a marketing company such as, for example, CATALINA MARKETING of St. Petersburg, Fla. The marketing server 209 may provide information to server 212 that enables server 212 to deliver tailored information to a shopper. For example, information from the marketing server 209 may help tailor the store page and/or specials that a shopper sees after checking-in. The server 212 may provide identifying information (e.g., demographics, shopper rewards data, electronic shopping list, other identifier) of the shopper to the marketing server 209 to thereby enable the marketing server 209 to provide pertinent data for the shopper. It is understood that the server 212 may be in communication with multiple marketing servers 209.

In some implementations, server 212 may be in communication with one or more additional servers. For example, server 212 may be in communication with a location server which contains information regarding the locations of products in one or more retail stores. The location server may utilize electronic shopping list information received from an electronic device and transmit item location information to the shopper based on items on an electronic shopping list. In some implementations a location server may transmit information on one or more items that are not on an electronic shopping list. In some implementations, one or more of the illustrated servers may not be present.

Figure 11:
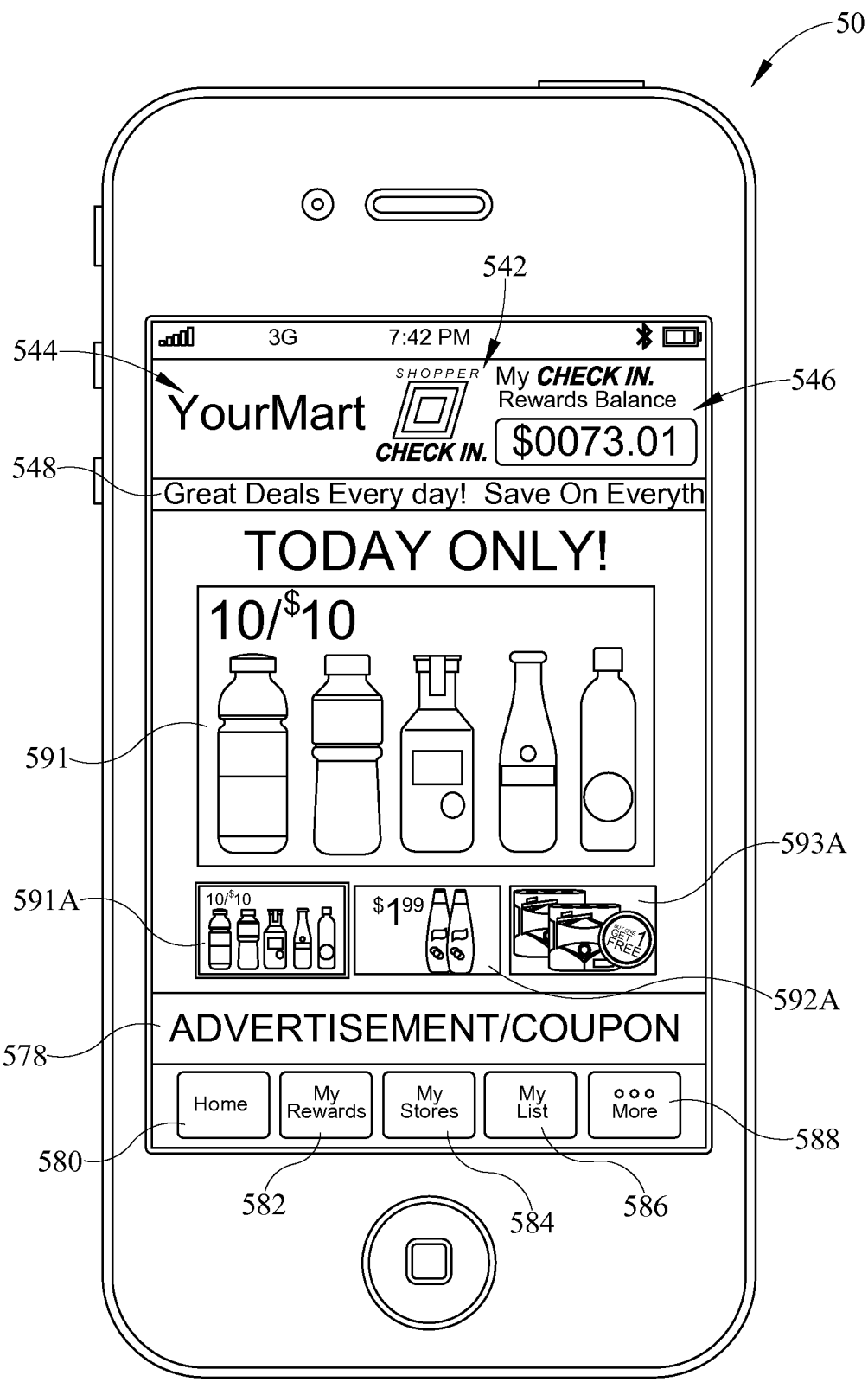
FIG. 11 illustrates a first targeted advertisement screen of the embodiment of the application for checking-in to a physical store.
Figure 12:
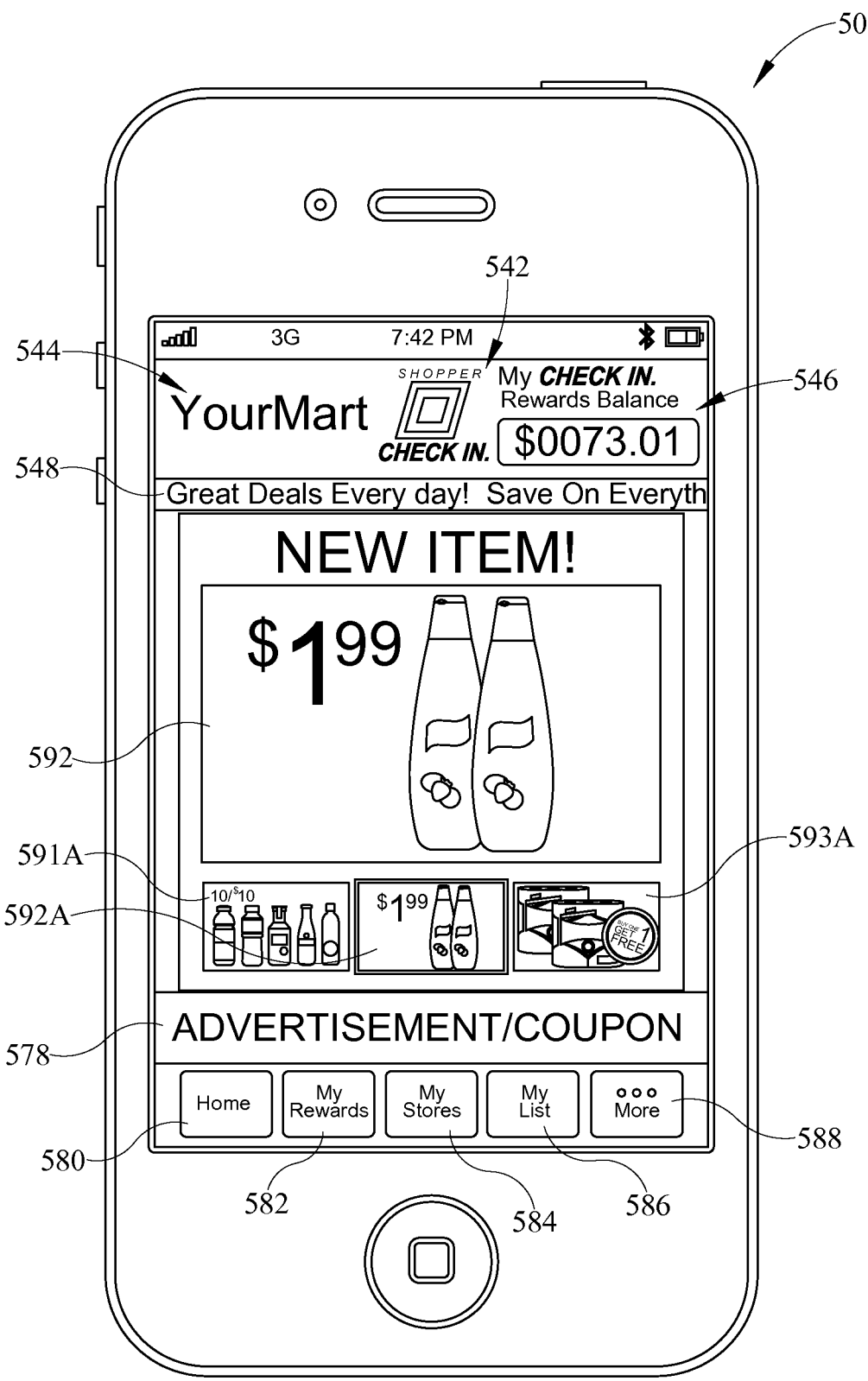
FIG. 12 illustrates a second targeted advertisement screen of the embodiment of the application for checking-in to a physical store.
Figure 13:
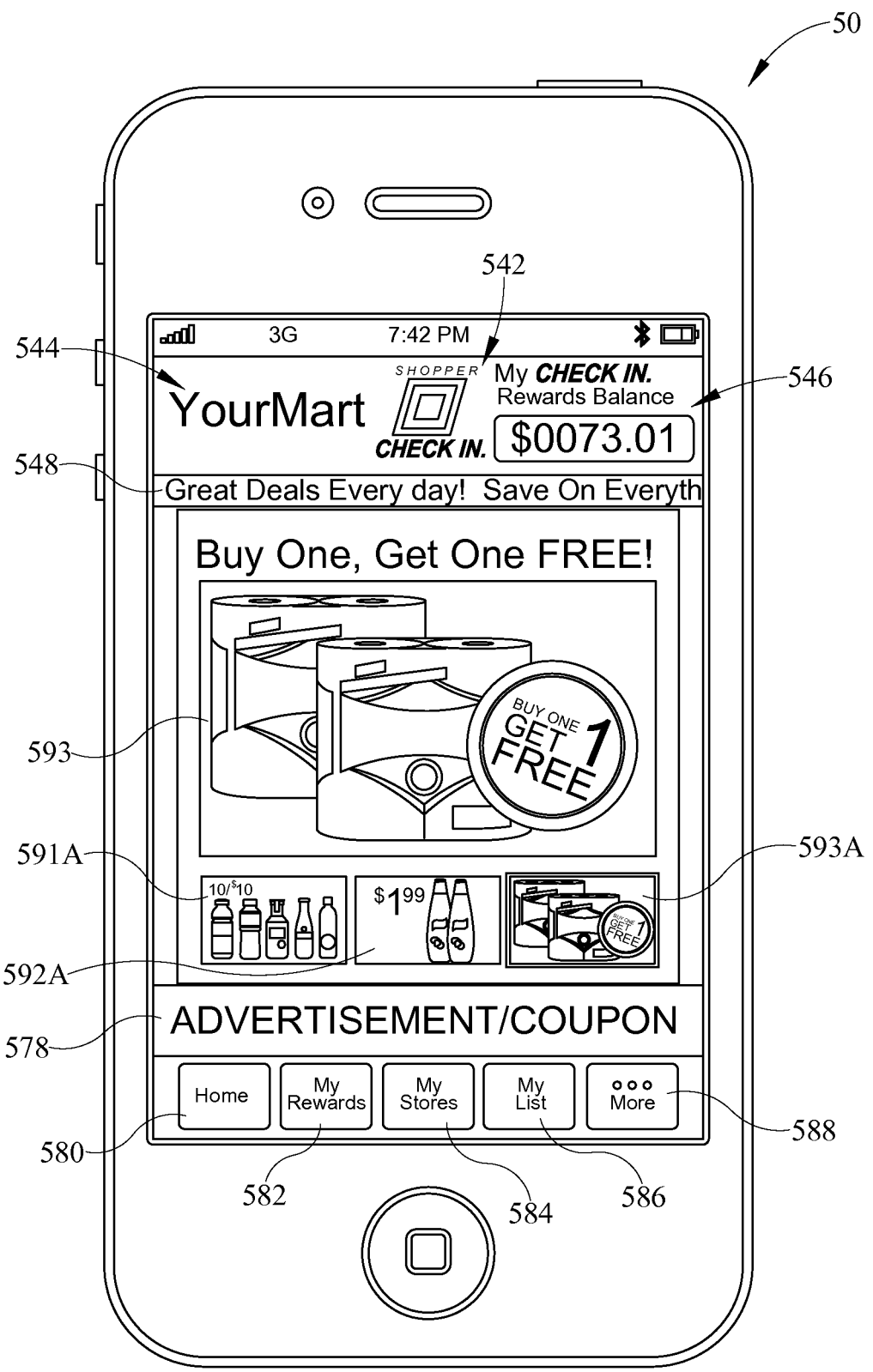
FIG. 13 illustrates a third targeted advertisement screen of the embodiment of the application for checking-in to a physical store.

Referring now to FIGS. 11-13, targeted advertisement screens of the application for checking-in to a physical store are illustrated. The screens may optionally be displayed to a shopper after the reward notification screen of FIG. 4 and prior to the store home screen of FIG. 5. FIG. 11 illustrates a screen showing a first targeted advertisement 591, FIG. 12 illustrates a screen showing a second targeted advertisement 592, and FIG. 3 illustrates a screen showing a third targeted advertisement 593. Smaller versions of each of the three targeted advertisements 591A, 592A, and 593A are also provided on each of the screens. Each of the screens of FIGS. 11-13 may be displayed for a given amount of time before transitioning to the next screen. A shopper may actuate the smaller versions of the targeted advertisements 591A, 592A, and 593A to manually transition between the screens.

The targeted advertisements in FIGS. 11-13 may be pertinent to the physical store that the shopper has checked-in to and/or to the shopper. For example, the targeted advertisements 591-593 may be based upon past shopping experiences of the shopper as ascertained from the application, a shopper rewards program of the store, a shopper rewards program of another store, and/or from one or more marketing companies. Also, for example, the targeted advertisements 591-593 may be based upon an electronic shopping list that has been submitted by a shopper. A shopper may optionally receive further pecuniary rewards for viewing the targeted advertisements 591-593.

Figure 14:
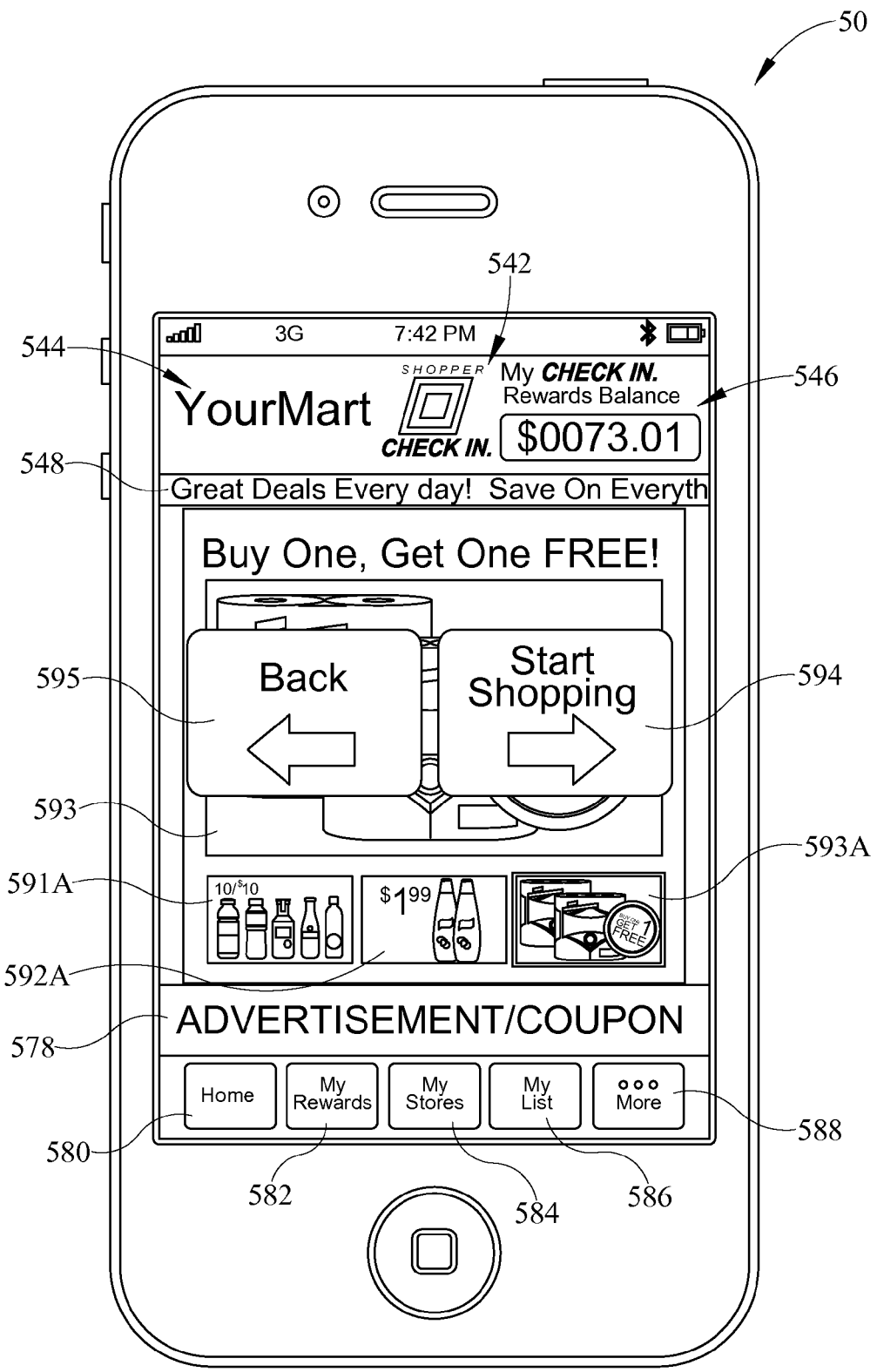
FIG. 14 illustrates a transitional screen of the embodiment of the application for checking-in to a physical store.

FIG. 14 illustrates a transitional screen of the embodiment of the application for checking-in to a physical store that may be displayed after the third targeted advertisement 593 is displayed for a period of time. The transitional screen enables the user to actuate the start shopping button 594 or the back button 595. The start shopping button 594 may direct the shopper to a store home screen such as the store home screen of FIG. 5. The back button 595 may direct the shopper back to the targeted advertisement screens of FIGS. 11-13.

Figure 15:
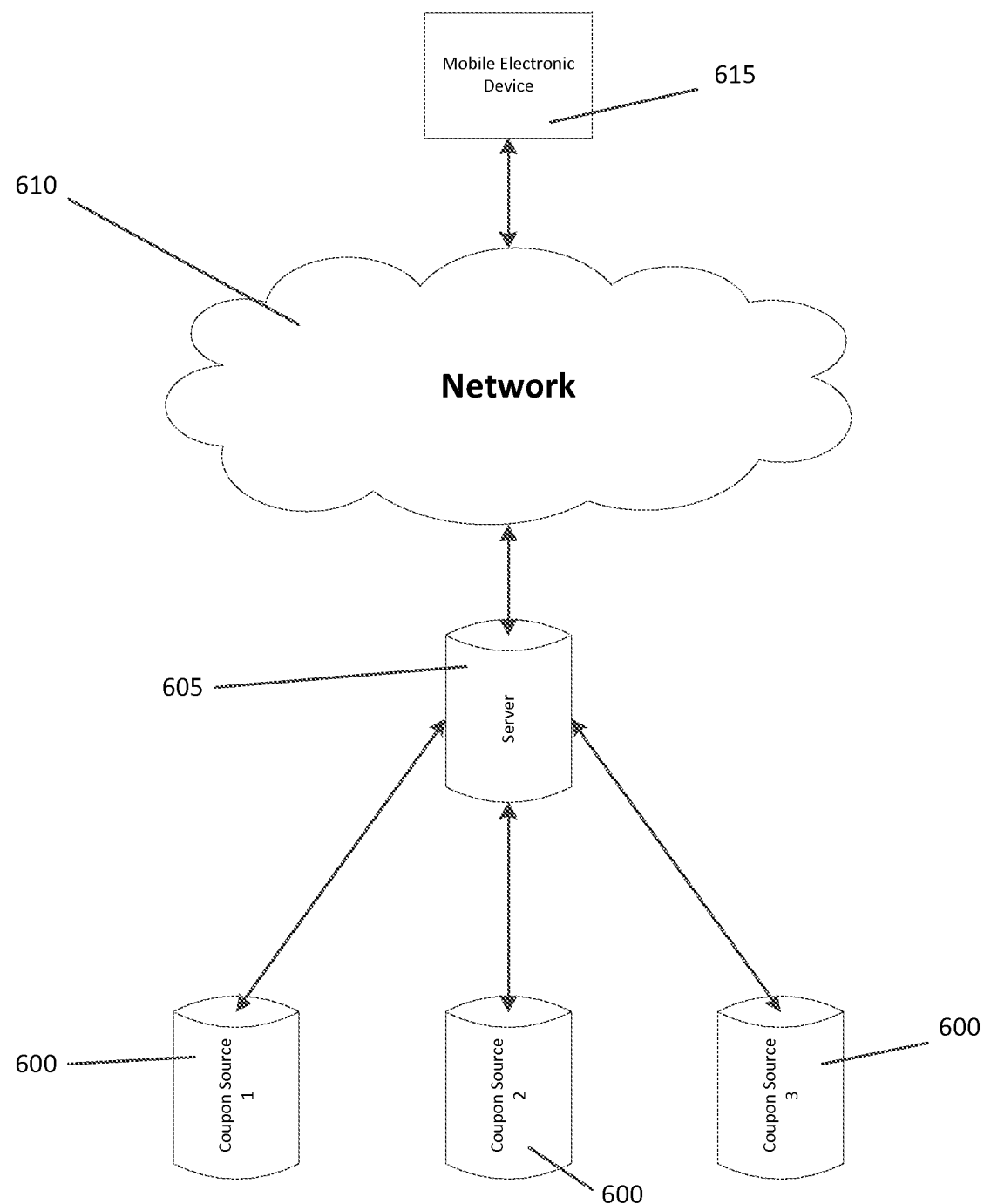
FIG. 15 illustrates a schematic of an example environment of a system for enabling a mobile electronic device to transmit an electronic shopping list to one or more servers.

FIG. 15 illustrates a schematic of an example environment of a system for enabling a mobile electronic device to transmit an electronic shopping list to one or more servers. In the example embodiment, a mobile electronic device 615 may send information, such as an electronic shopping list, to a centralized server 605. In some embodiments the mobile electronic device 615 may send information to more than one server 605. The server 605 may receive coupon data and/or other pecuniary reward from one or more coupon sources 600 pertinent to potential coupons and/or other pecuniary rewards to provide to shoppers who access the server 605 using a mobile electronic device 615. As discussed herein, aspects of the coupon data may be specific to the information provided to the server 605 by the mobile electronic device 615. In some embodiments the server 605 is operated by a specific retail chain and may be present in a particular store or off-site and accessible via network 610. In some embodiments the server 605 may be operated by a third party. The server 605 may be in communication with several coupon sources 600 which may include specific retail locations, retail chains, and/or product manufacturers. In some implementations the centralized server may not access an outside source for coupons and may distribute coupons that are stored internally in the centralized server 605. In some embodiments the coupon source 600 may be operated by a specific retail store, which may further analyze the provided information to determine whether coupons or other monetary incentives will be transmitted to the shopper. In some embodiments the electronic shopping list will be submitted directly to a server that is specific for a particular retail store.

In some embodiments a manager and/or other employee associated with a store may optionally select and/or provide a coupon based on analysis of contents of a transmitted shopping list. For example, an employee may be presented with items from a shopping list, optionally along with demographic information of a shopper associated with those items, and provide one or more coupons or other pecuniary awards associated with those items. For example, a manager may note a shopper has a large amount of items on the shopping list, is a frequent shopper, and may incentivize the shopper to purchase all items on the shopping list by offering money off of the total bill if at least a certain percentage of items on the shopping list are purchased. In some embodiments an employee and/or a server may additionally and/or alternatively utilize the shopping list to provide the shopper with additional information related to one or more items on the shopping list. For example, a database of aisle locations for items in a particular store may be accessed and the aisle location for one or more items provided to mobile electronic device 615 for display in combination with such items. For example, an aisle location for an item may be listed beside the item in the shopping list and may share one or more characteristics with the annotated shopping list illustrated in FIG. 23 and described herein. Also, for example, an employee associated with the store and/or one or more servers may analyze a shopping list, identify at least one item, and provide a user information related to that item. For example, identification of a particular item on a shopping list may result in a user and/or server providing the shopper with information related to the location of the item, instructions on how to use the item, other items that may complement that item, information related to competing items, etc.

Figure 16:
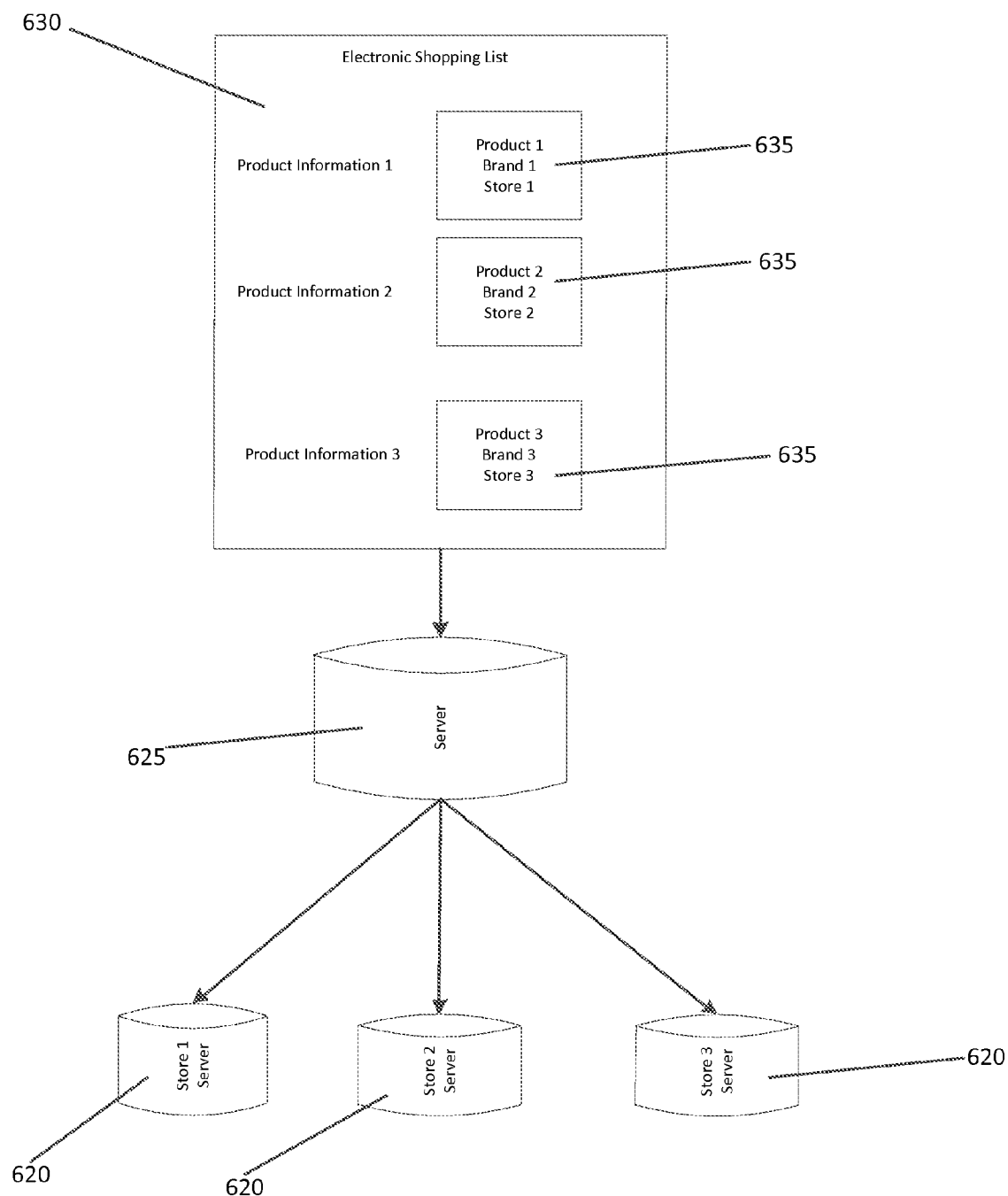
FIG. 16 illustrates another schematic of an example environment of a system for enabling a mobile electronic device to transmit an electronic shopping list to one or more servers via a network.

FIG. 16 illustrates another schematic of an example environment of a system for enabling a mobile electronic device to transmit an electronic shopping list to one or more servers via a network. The user has compiled an electronic shopping list 630 which contains three types of products 635, each associated with a unique brand and a unique intended retail location for purchasing each product. In some embodiments one or more of those elements may not be present. For example, in some embodiments Product 1 may be associated with Store 1 but not associated with any particular brand. In some embodiments the shopper may not have the option or may not be required to specify brand of a product to purchase and/or intended retail location to purchase a product. In some embodiments additional and/or alternative information may be associated with products, such as cost of the product and/or a coupon associated with a product on the electronic shopping list. The user submits the electronic shopping list 630 to an aggregate server 625. In some embodiments the electronic shopping list 630 may be sent as illustrated in FIG. 15 via a network 610 using a mobile electronic device 615 to a centralized server 605. The aggregate server 625 combines coupons and/or offers from a number of retail store servers 620 and may distribute coupons and/or other pecuniary reward to the shopper based at least in part on product type, intended retail store to purchase, and/or brand. In some embodiments the aggregate server 625 may combine offers from one or more retail stores and/or manufacturers. In some embodiments the aggregate server 625 may be operated by a party that analyzes the data in the electronic shopping list 630 and determines which retail store servers 620 will receive specific information on the shopping list, based on the data associated with each item on the shopping list. The aggregate server 625 may selectively forward various items and some or all of the data associated with each forwarded item to one or more retail store servers 620.

In some embodiments the retail server will receive all of the information contained in the electronic shopping list. In some embodiments the retail server will only be provided with information on items that are associated with that particular retail store. In some embodiments, the retail server may receive information about types of products on the electronic shopping list without the associated stores. For example, certain items may be stripped of information regarding the associated retail store and/or brand of a product when a product is forwarded to a store to entice a retail store to offer a product of the desired type to the shopper without knowing all of the details of the shopper's intended purchase. This may encourage a retail store to offer the shopper a discounted store brand of a product without revealing to the retail store any more information than needed. Also, for example, the aggregate server 625 may filter products on an electronic shopping list to eliminate products which are not sold at a particular store, such as filtering milk off of a shopping list that is to be forwarded to a home goods store.

In some embodiments an electronic mobile device may transmit a message to a server associated with a store indicating that the shopper is present at the store location. Additionally and/or alternatively, a server associated with a store may transmit a message to nearby mobile electronic devices to invite a shopper to check in to the retail store. The association of a shopper with a particular store may require one or more actions by the shopper to make the association. For example, the shopper may scan a check-in code located at the retail store in a manner similar to certain embodiments of checking in described herein. Also, for example, the shopper may enter an alphanumeric code that is present at the store location. The association between the shopper and the retail location may utilize one or more technologies from the mobile electronic device to detect presence. Additionally and/or alternatively, the shopper may have a list of retail stores to associate with and the shopper may choose the store with which the shopper would like to check in. The mobile electronic device may additionally and/or alternatively transmit location information to a retail store using, for example, cellular tower signal triangulation, GPS data, and/or Wi-Fi technology. The electronic mobile device may send the electronic shopping list to the store once an association with the store has been established and/or the mobile electronic device may wait for instructions to transmit the shopping list from the user. In some embodiments the electronic shopping list may be transmitted by a shopper independent of an association being established with a store. Any of these technologies may be used alone or in any combination. For example, the shopper may arrive at a store and would like to check-in with the store. The shopper may locate a QR scan code and/or an alphanumeric code to enter to alert the store of the shopper's presence. The electronic shopping list may be sent to the retail store and/or the mobile electronic device may prompt the shopper to send the electronic shopping list. In some embodiments the electronic shopping list may be sent to the retail store once the shopper and the store have been associated. For example, once a shopper has checked in with a store, the mobile electronic device may ask the shopper if the electronic shopping list should be transmitted to the retail store. If the shopper confirms the transmission, the mobile electronic device can send the electronic shopping list to the store. In some implementations the shopper will not be prompted to send the electronic shopping list and the mobile electronic device may automatically transmit the list upon association with the store.

In some embodiments the electronic shopping list may be provided to a server in response to a shopper indicating a desire to shop at a particular store. In some embodiments the desire may be indicated through one or more methods and/or apparatus used to detect the presence of a shopper in the vicinity of a store. In some embodiments the association between the shopper and a retail store may allow a shopper to transmit an electronic shopping list. For example, a server or other device associated with a store may detect the presence of the shopper when the shopper arrives at a store and offer the shopper the option to send a part or all of an electronic shopping list to the store. In some embodiments the electronic shopping list of a shopper may be automatically transmitted to a server or other device associated with a store once a shopper has been associated with a store.

The device may send the electronic shopping list 630 to one or more servers associated with the retail store. In some embodiments, after the server has received the shopping list, it may provide incentives to the shopper in order to entice the shopper to buy one or more items from the list at the retail store instead of purchasing the item at an alternate store. For example, the server associated with the retail store may send the shopper an electronic coupon for a product on the list which may incentivize the shopper to purchase the product at the retail store by lowering the price of the item. The item-specific incentives may originate with the retail store and/or from the producer of the item. Some incentives may be for an item of the same type as an item on the shopper's list but for a different brand of the product. For example, the shopper may have a specific brand of olive oil on the shopping list and the retail store may send the shopper an electronic coupon that offers a discount on a store brand olive oil. Also, for example, the shopper may indicate an alternative store where the shopper intends to purchase an item on the shopping list and the retail store may offer a coupon for its store to entice the shopper to purchase the product while shopping at the retail store instead of purchasing the product at a rival store. For example, the shopper may indicate that dish liquid will be purchased at Store 2, so Store 1 may offer a coupon for the same item or a similar item to the shopper to influence the shopper to buy the item at Store 1.

In some embodiments the server associated with the retail store receives information about items on an electronic shopping list, the server may analyze the items that it has received to determine whether the server has one or more coupons or other pecuniary rewards to provide to the shopper and/or if it is desirable to generate and/or enable generation of one or more coupons or other pecuniary rewards. The server may retrieve information on coupons from another server (e.g., operated by a specific manufacturer for a product), an additional server operated by the retail store, and/or a third party aggregate server of coupons from one or more different manufacturers. For example, a retail server may receive an electronic shopping list which lists "Brand 1 Dish Liquid." The retail server may analyze a database of offers and send the shopper a coupon for $1.00 off the price of "Brand 1 Dish Liquid." In some embodiments, the retail server may consult an additional database operated by the retail store to retrieve coupons for "Brand 1 Dish Liquid" to send to the shopper in response to the shopping list. In some embodiments the server may consult a database operated by "Brand 1" which may then send offers to either the store server to send to the shopper or directly send the coupons to the shopper. In some embodiments the server may additionally and/or alternatively consult a database operated by "Brand 2," which competes with Brand 1 to send a coupon for "Brand 2 Dish Liquid." Also, the server may present one or more items on a shopper's electronic shopping list to an individual associated with the store to enable the individual to offer coupons or other pecuniary reward to the individual via the mobile electronic device. The offered pecuniary reward may be chosen from a plurality of preselected potential rewards and/or may be created by the individual and optionally tailored to the particular shopper and/or tailored to the other items on the particular electronic shopping list.

Figure 17:
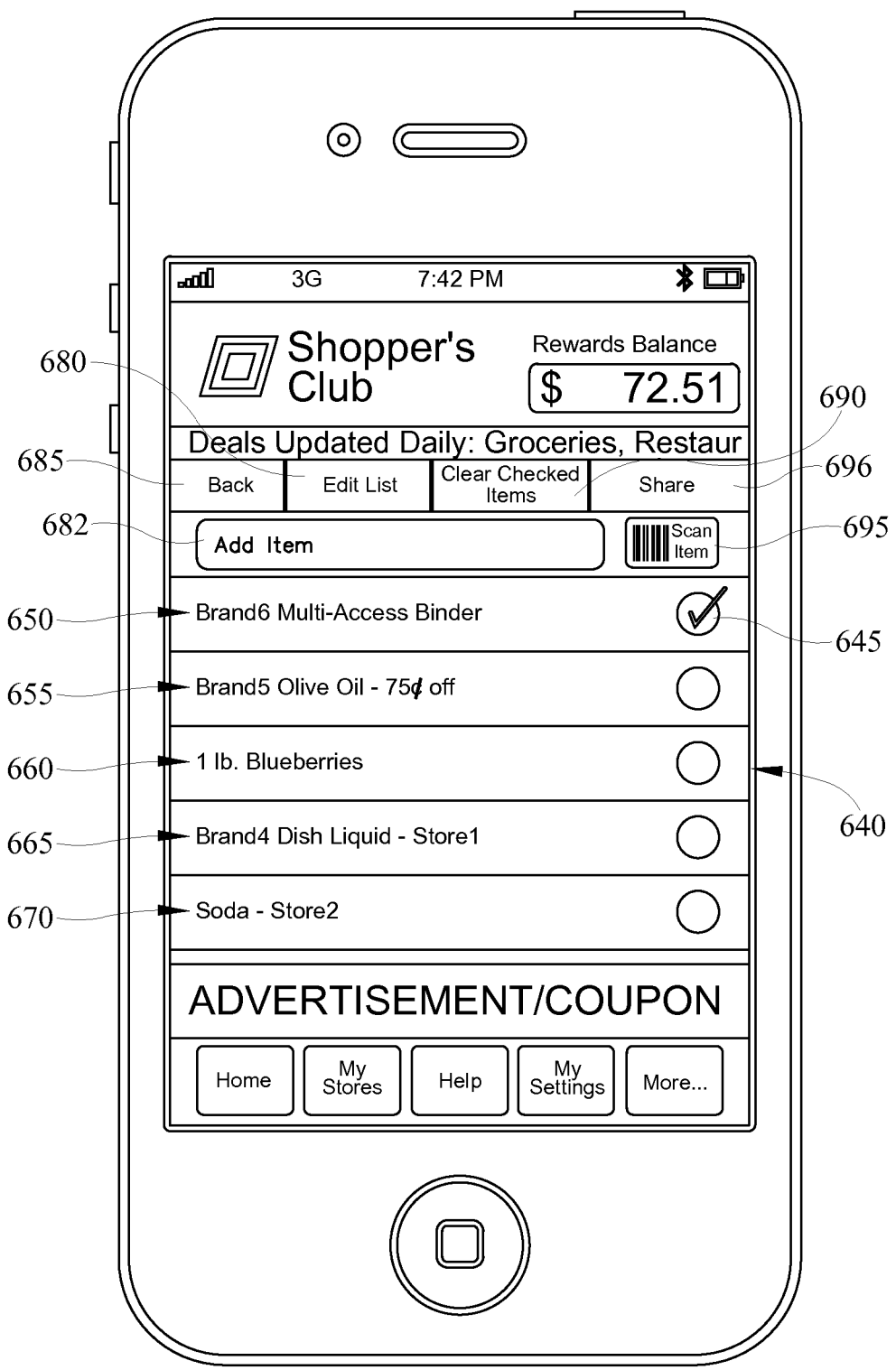
FIG. 17 illustrates the mobile electronic device displaying an example of an electronic shopping list screen of an embodiment of an application for utilizing an electronic shopping list.

Referring to FIG. 17, a shopper may access an electronic shopping list 640 by actuating the My List icon 586 (FIG. 2). The electronic shopping list 640 may show a number of items 650, 655, 660, 665, 670 which the shopper has selected to highlight as possible purchases in a retail store. An item displayed on the shopping list screen 640 may have a retail store (such as 665 and 670) and/or a product brand (such as 650 and 655) associated with the item and/or an item on the list may not have a retail store or a product brand associated with the item (such as 660). Additionally, the shopping list may display a discount value associated with the item (such as 655). In the displayed electronic shopping list 640, the shopper has added olive oil with an associated brand "Brand 6" 655. The olive oil also has an associated coupon incentive of $0.75 off the purchase of the product. The shopper may alter the contents of the electronic shopping using an "Edit List" icon 680, such as changing the description of an item, the brand of the item, and/or the specified location to purchase an item. Additionally, the shopper may mark an item for removal, such as when an item has been purchased, using a checkmark 645 and then requesting the checked items to be removed using the clear checked items icon 690. In some embodiments the products on the electronic shopping list may be removed when the shopper checks out and has purchased a product on the list. For example, a shopper who has transmitted an electronic shopping list to a retail store may also have a loyalty card with the same store. When the shopper produces the loyalty card at check out, information related to the products purchased by the shopper may be transmitted to the store. After check out, the store may transmit a message to a server and/or the mobile electronic device of a shopper to remove one or more items which have been purchased by the shopper and that were previously on the electronic shopping list.

In some implementations an electronic shopping list 640 may have additional information associated with one or more items. For example, an item 650, 655, 660, 665, 670 may have item location information associated with the item and may share one or more characteristics with the annotated electronic shopping list illustrated in FIG. 23 and described herein. In some implementations one or more described aspects of electronic shopping list 640 may not be present and/or additional aspects may be present.

The shopper may add items to the shopping list using the "Add Item" text box 682 by manually entering a description of a product. When a shopper selects the text box 682, a touch-screen keyboard may appear and allow the user to enter text that is descriptive of an item to be purchased. Additionally and/or alternatively, the shopper may be presented with options to enter a store to purchase an item and/or a brand for a product. Additionally and/or alternatively, the shopper may be able to use voice recognition software present on the mobile electronic device to audibly describe a product which may then be translated into text. The item may then appear on the electronic shopping list 640.

Figure 18:
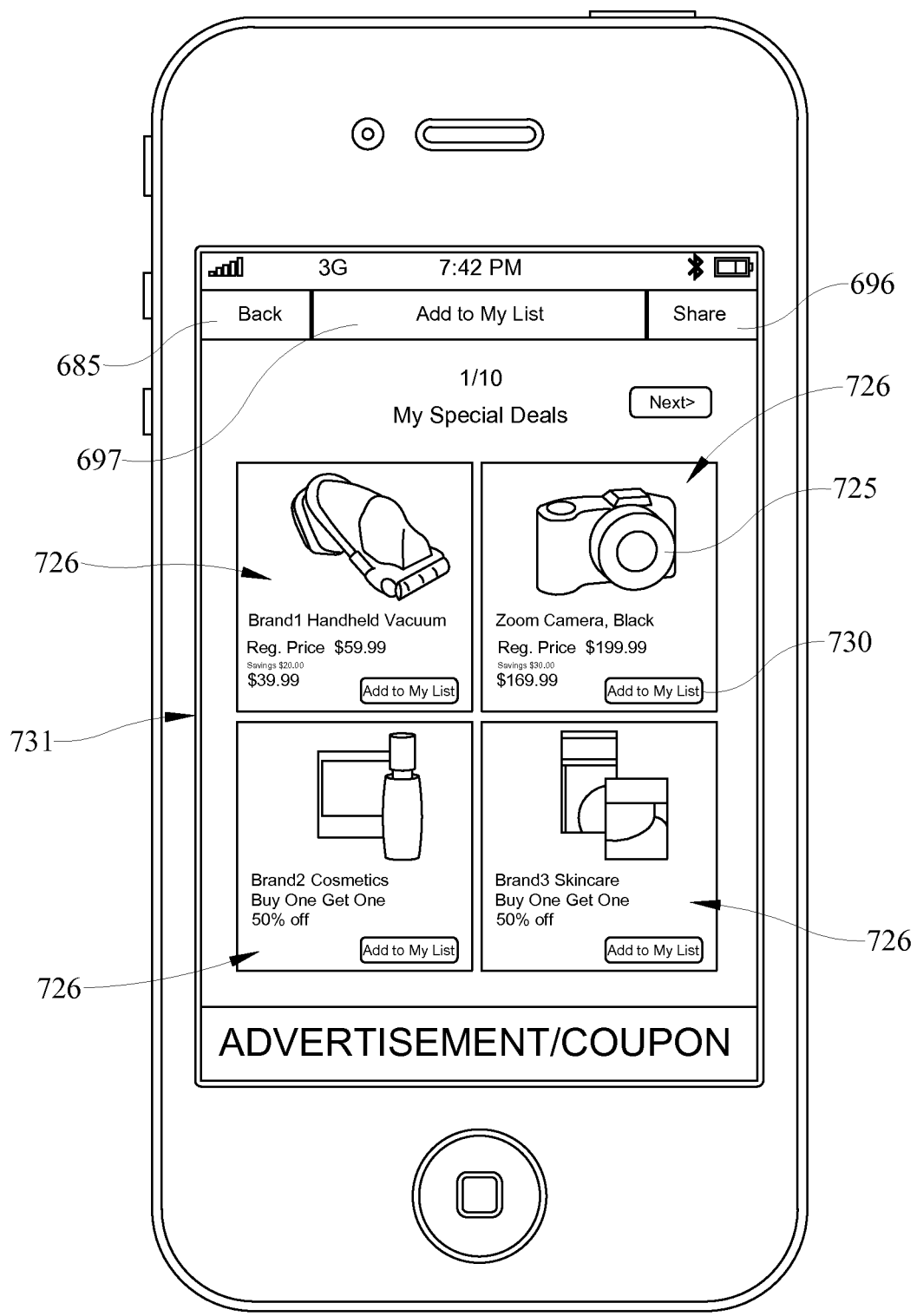
FIG. 18 illustrates the mobile electronic device displaying an example of an electronic advertisement screen of the embodiment of the application for utilizing an electronic shopping list.

Referring to FIG. 18, the mobile electronic device displaying an example of an electronic advertisement screen is displayed. The electronic advertisement screen 731 displays four advertisements 726 from an electronic flyer, which may be distributed by a particular store, a particular manufacturer, and/or a third party advertiser. Each advertisement 726 may display a visual representation of the product that is advertised 725 and may include additional information about the product, such as a product description, amount of discount, discounted price, and/or price before a discount. Each advertisement may have an "add to my list" icon 730 associated with the advertisement. Add to my list icon 730, when actuated, may add the product 725 to the electronic shopping list. Additionally and/or alternatively, the "add to my list" icon 730 may associate the source of the advertisement 726 with the product on the electronic shopping list. For example, the shopper may desire to purchase the camera in the upper-right advertisement of the electronic advertisement screen 731. The advertisements 726 may have been transmitted to the mobile electronic device by Store 1, which carries the camera and is currently selling the camera at a discount. Upon adding the camera to the electronic shopping list, Store 1 may also be associated with the product in the electronic shopping list to remind the shopper to purchase the camera at Store 1.

The electronic advertisement screen 731 may be displayed in response to the shopper actuating the daily deals icon 554, the national ads icon 558, and/or an alternative icon on the mobile electronic device. A previous screen may be accessed using the back icon 685. Additionally and/or alternatively, a shopper may add items to the electronic shopping list using the "add to my list" icon 697 which may add a selected advertisement, a page of advertisements, and/or all of the advertisements in an electronic flyer. In the illustrated embodiment, the shopper may share one or more advertisements and/or coupons using the "Share" option 696. This option may post the advertisements or coupons to a social media site, such as FACEBOOK and TWITTER, or enable the shopper to email one or more advertisements in the electronic flyer to another account (e.g., informing a friend of a current sale at a retail store).

Figure 19:
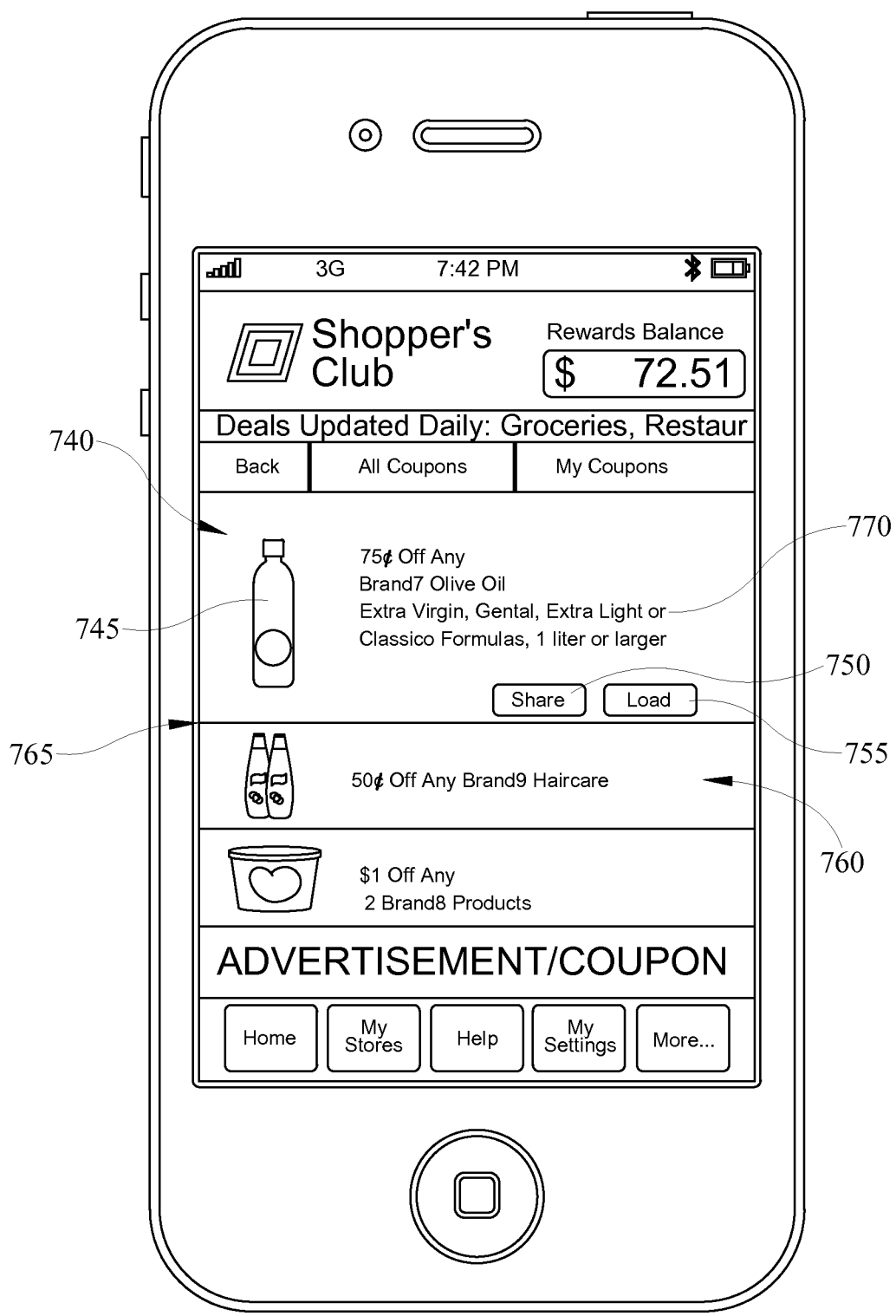
FIG. 19 illustrates the mobile electronic device displaying another example of an electronic advertisement screen of the embodiment of the application for utilizing an electronic shopping list.

Referring to FIG. 19, an electronic advertisement screen 765 for adding advertisements to a rewards card is illustrated. The advertisements displayed on the electronic advertisement screen 765 may have a visual representation of a product 745 and/or a written description of a product 770. Each advertisement 740 may contain an incentive to purchase the product, such as a discount. Additionally and/or alternatively, one or more of the advertisements 740 may contain a load icon 755 which may allow a shopper to add the discount information in the advertisement to a shopper rewards card. In some embodiments the load icon 755 may additionally add the item to the electronic shopping list. The discount may be applied to a purchase when the shopper checks out of the store. For example, the shopper may decide to purchase the olive oil that is show in the first advertisement 740. The shopper may choose the load icon 755 and the discount for the olive oil may be associated with the shopper's rewards card account. When the shopper pays for the items purchased in the store, the retail store may associate the purchased item with the advertisement and apply the discount at that time (in this case, $0.75 off the olive oil). In some embodiments, the shopper may share one or more advertisements and/or coupons using the "Share" option 696. This option may post the advertisements or coupons to a social media site, such as FACEBOOK and TWITTER, or enable the shopper to email one or more advertisements in the electronic flyer to another account (e.g., informing a friend of a current sale at a retail store).

Figure 20:
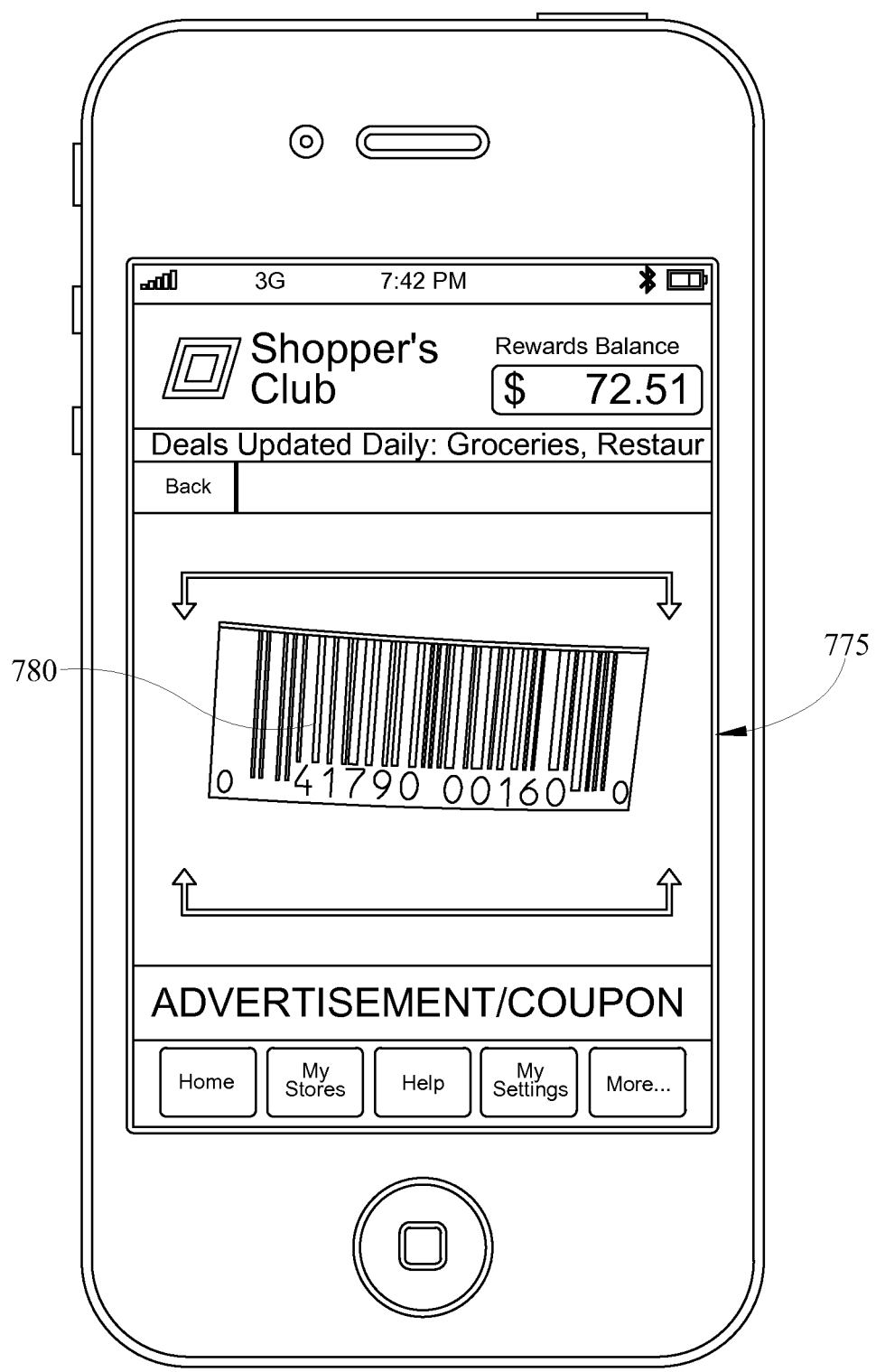
FIG. 20 illustrates the mobile electronic device displaying an example of a barcode scanning screen of the embodiment of the application for utilizing an electronic shopping list.

Referring to FIG. 20, a sample screen of a scanning feature is illustrated. The scanning screen 775 displays an image of a barcode 780 that may be visible when a shopper is holding the mobile phone 50 such that a mobile device camera has a barcode 780 in its field of view at a sufficiently close distance to capture and/or read contents. The scanning screen 775 may optionally remain visible for an amount of time to provide the shopper with verification that the barcode 780 was scanned by the mobile phone 50. Optionally, video, images, and/or audio may be provided in the viewfinder area and/or elsewhere on the screen or from the mobile phone 50 to additionally or alternatively instruct the shopper how to scan a barcode 780. The barcode may be a universal product code (UPC) which a shopper would to add to an electronic shopping list. The product may be a product which the user finds in a retail store or the product may be a product that a shopper finds elsewhere and would like to add to the electronic shopping list. For example, the shopper may run out of a product at home and scan the UPC code of the empty product as a reminder to later purchase the product at the store. Alternatively, the scanning screen 775 may be used to scan a barcode that is present in a retail store, such as at the entrance of the store or on a flyer near a product. Scanning of the barcode may cause the mobile device to add the product to the shopper's electronic shopping list or may be used to send the user a coupon or special offer based on the product. For example, the mobile device may consult a database to identify the UPC as corresponding to a purchasable item and, in response, add the item to the shopping list. In some embodiments scanning of a QR code (or other barcode) may retrieve certain information from the QR code and/or cause one or more items associated with the QR code to be added to the electronic shopping list. For example, scanning of a QR code associated with a recipe may cause a webpage to be retrieved by the mobile electronic device. The webpage may be associated with the recipe and the URL of the webpage may optionally be embedded in the QR code. The scanning of the QR code may optionally additionally present the user with the option of adding ingredients from the recipe to the electronic shopping list.

Figure 21:
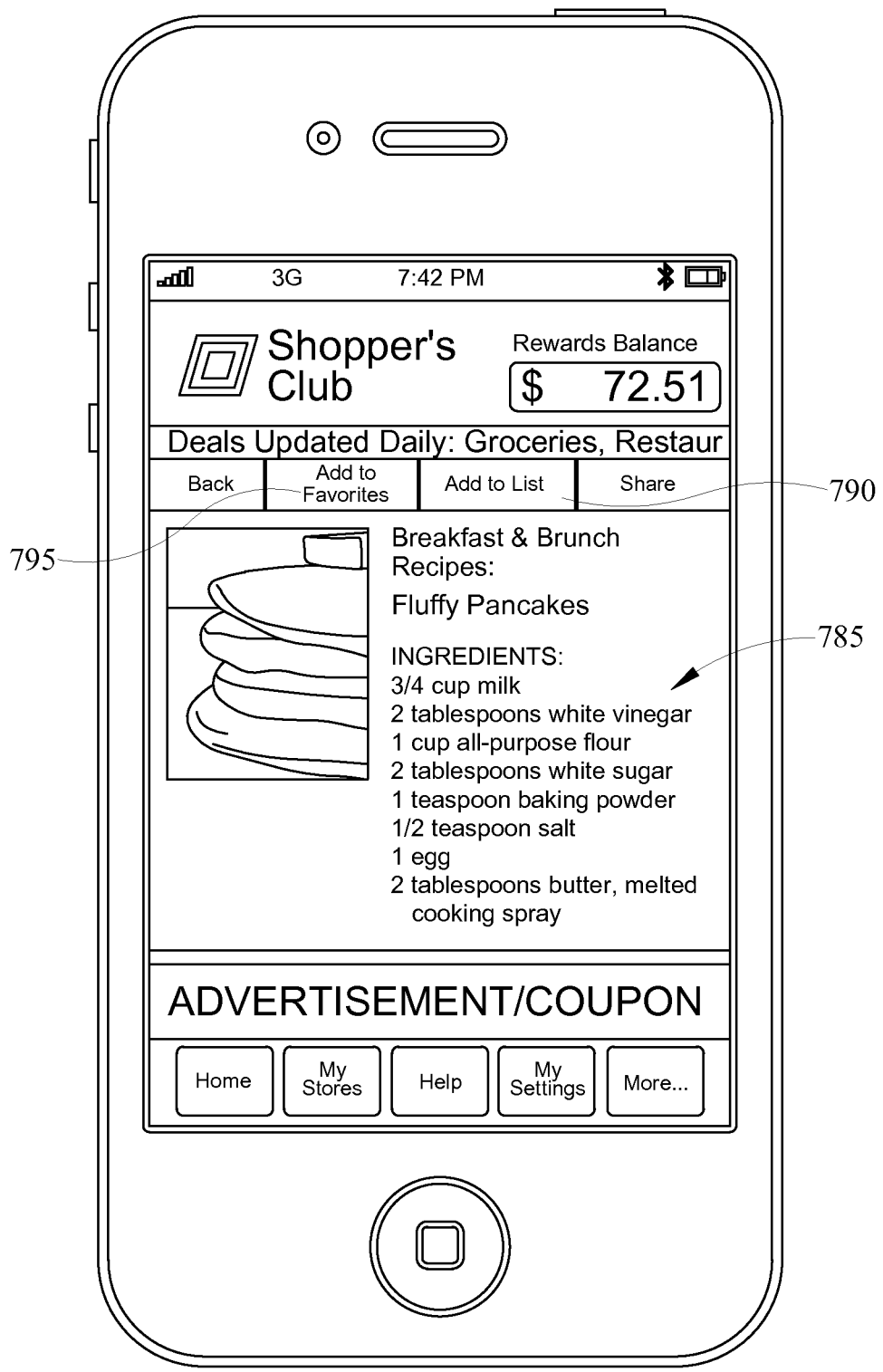
FIG. 21 illustrates the mobile electronic device displaying an example of a recipe display screen of the embodiment of the application for utilizing an electronic shopping list.

Referring to FIG. 21, a digital recipe feature is illustrated. The digital recipe 785 may be accessed through the mobile cookbook icon 572 (FIG. 2) which, when actuated, may display one or more recipes that are retrieved from a website or a recipe which is stored on the electronic device. The digital recipe 785 may include a list of ingredients which may be added to the shopper's electronic shopping list by actuating the "Add to List" icon 790. Additionally, the shopper may mark a recipe for later reference using the "Add to Favorites" icon 795. The shopper may choose to add the ingredients of the recipe to an electronic shopping list and the ingredients will appear on the list. For example, a recipe may require one pound of blueberries, which may be added to the shopping list and would then appear on the electronic shopping list (such as shopping list entry 660 on FIG. 17). Added items may be associated with a particular brand and/or retail store based on a recipe and/or user preferences. For example, a recipe may be published by Store 1 which, when a shopper adds the recipe ingredients to an electronic shopping item, may associate Store 1 with the added recipe ingredients. Also, for example, Brand 1 may publish a recipe which, when the recipe ingredients are added to an electronic shopping list, associates Brand 1 with the items that are manufactured by Brand 1. Also, for example, the shopper may have the option to add a brand and/or retail store with one or more ingredients that have been added to the electronic shopping list.

Referring to FIG. 22, a shopping cart 820 having a display with a store map and barcode is illustrated. The shopping cart 820 may share one or more aspects with shopping cart 20 illustrated in FIG. 1 and described herein. An informational display 830 is attached to the shopping cart 820 and may share one or more characteristics with informational display 30. The informational display 830 retains a magazine insert 836 having a QR type barcode 838 and a store map 840 on an outward facing side of an outermost page thereof. In some implementations store map 840 and/or barcode 838 may be cohesively formed with or fixedly attached to the informational display 830. The magazine insert 836 may additionally or alternatively share one or more aspects with the magazine insert 36 as illustrated in FIG. 1 and described herein. The QR barcode 838 may be utilized by an electronic device to check-in to a store location, access a web address, and/or notify one or more applications of the presence of a shopper in a particular retail store. Although QR barcode 838 is depicted herein as being on magazine insert 836, one of ordinary skill in the art, having had the benefit of the present disclosure, will recognize and appreciate that in alternate embodiments the QR barcode 838 may be otherwise coupled to or integrally formed with the shopping cart 820. Moreover, as described in detail herein, one of ordinary skill in the art, having had the benefit of the present disclosure, will recognize and appreciate that in some alternative embodiments the QR barcode 838 may be provided coupled to alternative items in a retail store. For example, in some embodiments the QR barcode 38 may be provided on posters, may be provided on an entrance door of a store, may be provided on standalone displays, may be provided on small shopping baskets, and/or may be provided on a circular ad and/or circular ad stand. Providing the QR barcode 838 proximal to the entrance of a store may provide a shopper with the opportunity to utilize the QR barcode 838 within the first minutes of entering the store.

In the illustrated embodiment, the shopper may utilize a cell phone 50 to alert one or more applications executing on cell phone 50 to access a website specific to the retail store where the shopper is present. The website may provide an application executing on cell phone 50 with the specific locations of merchandise in the retail store. In some embodiments, the embedded website may provide a listing of aisle designations for one or more products, may provide a general store location for one or more items, and/or may provide a listing of items which are available in the retail store for purchase. For example, the cell phone 50 may be provided with an alphabetical listing of all of the products in the retail store and an aisle number associated with each product. In some implementations, cell phone 50 may be provided with an annotated shopping list associating one or more items on an electronic shopping list with a location in the retail store. Store map 840 may provide a visual representation of areas, aisles, and/or store layout information to assist a shopper in locating items in the retail store and may share one or more characteristics with the information provided to the cell phone 50 upon utilization of the QR barcode 838.

Figure 23:
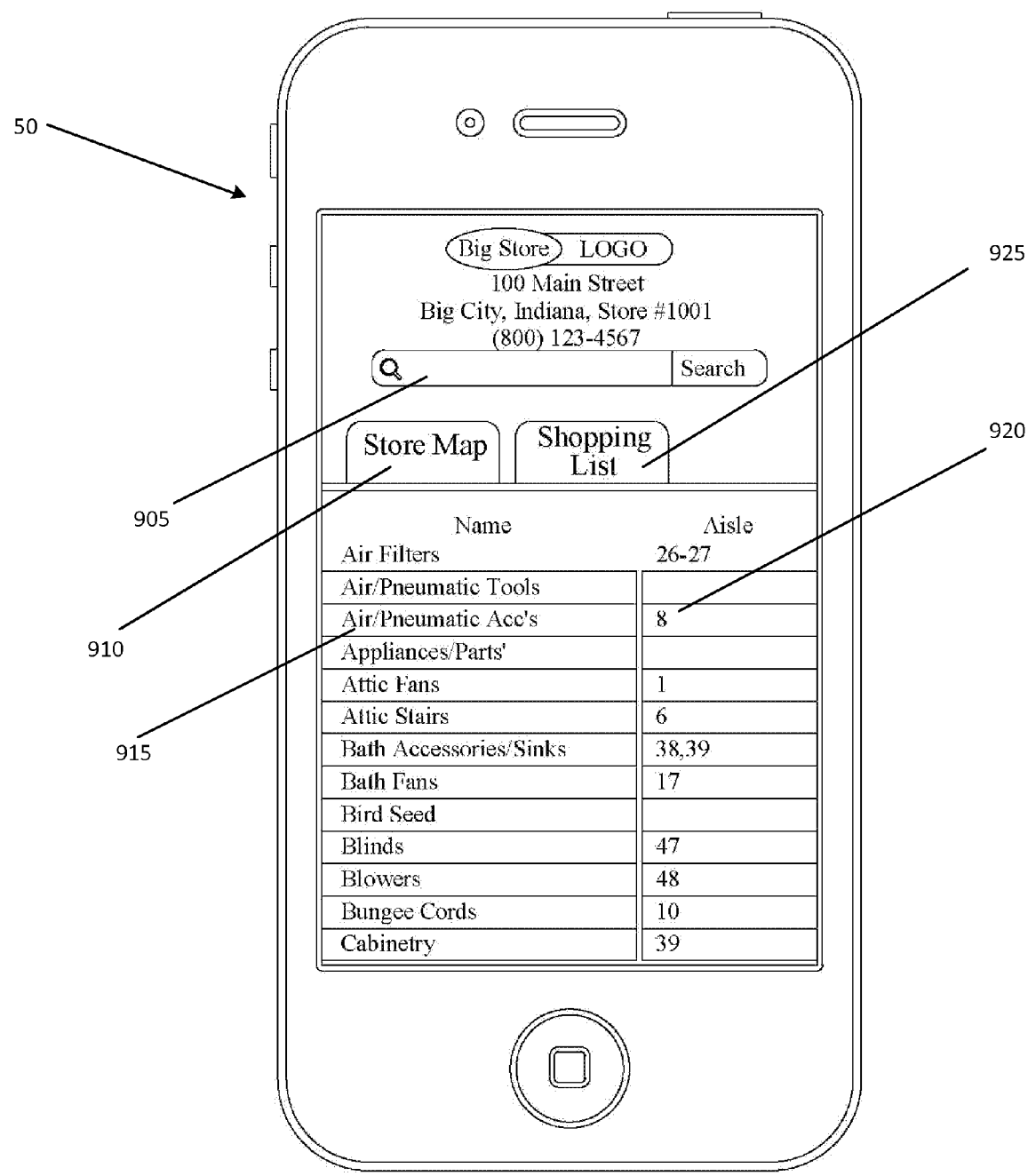
FIG. 23 illustrates the mobile electronic device displaying an example of a sorted electronic shopping list with aisle designations embodiment of the application for utilizing an electronic shopping list.

Referring to FIG. 23, cell phone 50 is illustrated displaying an example of a sorted electronic shopping list with aisle designations embodiment of the application for utilizing an electronic shopping list. The aisle designation list contains entries for retail items 915 with corresponding aisle locations 920. The embodiment has tabs to toggle between a shopping list display 925 and a store mapping display 910. In some embodiments, toggling to store mapping display 910 may display an electronic visual map of the retail store which shares one or more characteristics with store map 840. In some implementations an electronic visual map of the store may include interactive links, utilize GPS or other location technology to customize the map for a particular shopper, and/or indicate the location of one or more items from an electronic shopping list. For example, an electronic visual map may show a detailed map of the produce section of a grocery store based on GPS data indicating that the shopper is in the produce section. Additionally or alternatively, the shopper may interface with the electronic map to indicate, such as by tapping a particular aisle on the map, that more information is desired, such as specials specific to that aisle and/or a listing of the items in that aisle. For example, the shopper may tap the produce section on the electronic map and a detailed map of the produce section may be presented along with the location of one or more items on the electronic shopping list. The embodiment additionally has a search field 905 to facilitate locating a specific item to allow a user to quickly find an item in the list. For example, a shopper may type "attic fans" into search field 905 and subsequently be shown an aisle designation for attic fans.

In the illustrated embodiment, the shopper scans a QR barcode 838 utilizing cell phone 50 such as illustrated in FIG. 3 and described herein. In some implementations scanning QR barcode 838 may or may not trigger one or more pecuniary rewards, coupons, and/or other incentives to be transmitted to cell phone 50. For example, scanning QR barcode 838 may initiate communication between cell phone 50 and a server, allowing a store map to be downloaded to cell phone 50 with or without indicating to the server that the shopper is present in the retail store. In some implementations, scanning the QR barcode 838 alerts an application on cell phone 50 of the presence of the shopper in a specific retail store. In some embodiments the cell phone 50 may send a notification to a server administered by the specific retail store, a server administered by a third party, and/or a server administered by the retail store chain. In some embodiments the cell phone 50 may receive information via a website embedded in the QR barcode and/or through access to a database or server based on information associated with the QR barcode 838. In some implementations, shopper presence in a store may be further detected using BLUETOOTH, Wi-Fi, and/or GPS. For example, a QR barcode 838 may have the URL "www.store.com" encoded in the barcode, which, when scanned by a device, directs an application to that website. The embedded URL may be unique to a particular store location or may be general for the chain of stores and, using additional location software, determine the specific location. In some implementations, presence in a store location may be detected independent of scanning QR barcode 838. For example, shopper presence may be detected based exclusively on BLUETOOTH, Wi-Fi, GPS, and/or alternate location detection protocol.

Information embedded in barcode 838 may be utilized by cell phone 50 to initiate communication between cell phone 50 and a remote computing device via a communications network. Cell phone 50 may transmit an electronic shopping list to the remote computing device as previously described herein. In some implementations, the electronic shopping list is stored in the memory of cell phone 50. In other implementations, an electronic shopping list may be accessible utilizing one or more remote computing devices, such as remote databases, cloud computing storage, and/or one or more applications executing locally on cell phone 50 or on a remote computing device. For example, an electronic shopping list may be stored on a remote database and transmitted from the remote database to a remote server for annotation.

In some implementations, cell phone 50 initiates communication with a remote computing device. Cell phone 50 may transmit information to identify the location of the shopper and an electronic shopping list. The remote computing device may have access to a collection of item descriptions and locations for items within one or more physical retail stores. The remote computing device may analyze the items on the transmitted electronic shopping list and annotate one or more items on the electronic shopping list with location information that is unique to the store where the shopper is located. For example, an electronic shopping list may include "eggs." Cell phone 50 may send the electronic shopping list and an indication that the shopper is in "Store 1." The remote server may access item location information for Store 1 and determine that eggs may be found in aisle 1. The remote server may annotate the electronic shopping list with this information and transmit the annotated shopping list back to cell phone 50 to assist the shopper in finding eggs in Store 1.

In various implementations, the mobile device may contain a first electronic shopping list containing items the shopper is interested in purchasing at the physical retail store location. The items stored in the first electronic shopping list may be annotated by the remote server. In various embodiments, the remote server or the mobile device may create a second electronic shopping list, the second electronic shopping list a subset, in some embodiments, of items from the first electronic shopping list. The second electronic shopping list may contain a subset of items from the first list which are actually located within the identified physical store in which the user is located. The server or computing device may annotate the second electronic shopping list with item location information within the physical store. Thus, in various embodiments, the system may create a subset of items extracted from the first electronic shopping list which contains either the exact product the user is wanting to purchase or similar replacement products which the server identifies within the physical store.

In the illustrated embodiment, the cell phone 50 displays an annotated listing of items. The displayed listing may share one or more characteristics with the electronic shopping list previously described herein. In some embodiments, the listing of items may include one or more items that are on an electronic shopping list which is stored on the cell phone. In the illustrated embodiment, the list of items is sorted in alphabetical order. In other embodiments, the listing of items may be organized based on the proximity of items in the retail store. For example, the list may be sorted so that items in the frozen foods section are listed proximate to each other in the presented list. Additionally or alternatively, the items may be sorted based on the ordering of aisles in the retail store (e.g., all items in aisle 1, followed by all items in aisle 2, etc.).

In the illustrated embodiment the shopper utilizes a barcode to indicate the presence of the shopper in a particular retail store. In some embodiments additional and/or alternative methods and/or apparatuses may be utilized to associate a retail store with a shopper. For example, the shopper may notify one or more applications of a current retail location by transmitting an alphanumeric code printed on one or more items in a retail store, the user may respond to a notification that is sent to cell phone 50, and/or an application may automatically associate a retail store with the shopper when the shopper is detected to be proximally located to the retail store.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method of utilizing an electronic shopping list to locate products, comprising:
    receiving data from a mobile electronic device of a shopper in response to scanning a code at a physical retail store utilizing said mobile electronic device;
    identifying said physical retail store in response to receiving said data;
    identifying product location information of said physical store, said product location information indicative of actual locations of in-store products in said physical retail store;
    identifying an electronic shopping list of listed products in which said shopper has interest in purchasing;
    associating at least one store-specific location with a product of said listed products on said electronic shopping list, wherein said at least one store-specific location is at least partially based on said product location information and indicative of where said at least one product is located in said physical retail store; and
    sorting said electronic shopping list into a sorted electronic shopping list, said sorting at least partially based on said store-specific locations associated with said products on said electronic shopping list, wherein said products which have proximate said store-specific locations relative to one another are grouped together in said sorted electronic shopping list.

2. The method of claim 1, wherein said physical retail store is identified at least partially based on GPS data.

3. The method of claim 1, wherein said physical retail store is identified at least partially based on Wi-Fi data.

4. The method of claim 1, wherein said physical retail store is identified at least partially by store identification data that is embedded in said code.

5. The method of claim 1, wherein said code is a check-in code.

6. The method of claim 1, wherein said product location information is a map of said physical store.

7. A method of utilizing an electronic shopping list to locate products, comprising:
receiving a shopping list annotation notification from a mobile electronic device of a shopper, said shopping list annotation notification received in response to said shopper interacting with an in-store interface in a physical retail store utilizing said mobile electronic device;
identifying product location information of said physical store, said product location information indicative of physical locations of in-store products in said physical store;
identifying an electronic shopping list of listed products that said shopper has interest in purchasing;
associating at least one store-specific location with a product on said electronic shopping list, said at least one store-specific location based at least partially on said product location information and indicating where said product is located in said physical retail store;
sorting said electronic shopping list into a sorted electronic shopping list, said sorting at least partially based on said store-specific locations associated with said products on said electronic shopping list, wherein said products which have proximate said store-specific locations relative to one another are grouped together in said sorted electronic shopping list.

8. The method of claim 7, wherein said in-store interface is a scannable code.

9. The method of claim 8, wherein said physical store is identified based on store identification data that is embedded in said scannable code.

10. The method of claim 9, wherein said physical store is identified at least partially based on one of Wi-Fi data and GPS data.

11. A method of utilizing an electronic shopping list to locate products, comprising:
receiving a shopping list annotation notification from a mobile electronic device of a shopper indicating a desire of a shopper to obtain shopping item locations of items on a first electronic shopping list stored by the mobile electronic device, the first electronic shopping list including a list of products that the shopper has an interest in purchasing;
identifying a physical retail store by the mobile electronic device;
identifying product location information in said physical store for a plurality of products listed in the first electronic shopping list stored by the mobile electronic device, the product location information indicative of physical locations of in-store products in said physical store;
associating at least one store-specific location with a product on said electronic shopping list to create a second electronic shopping list;
said second electronic shopping list including a subset of items of said first electronic shopping list indicative of items on said first electronic shopping list located in said physical store;
said second electronic shopping list including said subset of items and appended associated store-specific product location information indicating where each of said subset of items are located in said physical retail store.

12. The method of claim 11, further comprising sorting said products of said second electronic shopping list to create a sorted second electronic shopping list.

13. The method of claim 12, wherein said sorted second electronic shopping list is sorted at least partially based on said appended associated store-specific product location information indicating where each of said subset of items are located in said physical retail store.

14. The method of claim 11, further comprising sorting said second electronic shopping list into a sorted electronic second shopping list, said sorting at least partially based on said appended associated store-specific product location information indicating where each of said subset of items are located in said physical retail store, wherein said subset of items which have proximate locations relative to one another are grouped together in said sorted electronic second shopping list.

15. A system, comprising:
memory storing instructions;
one or more processors operable to execute the instructions;
wherein the instructions comprise instructions to:
receive a shopping list annotation notification from a mobile electronic device of a shopper indicating a desire of a shopper to obtain shopping item locations of items on a first electronic shopping list stored by the mobile electronic device, the first electronic shopping list including a list of products that the shopper has an interest in purchasing;
identify a physical store of interest;
identify product location information in said physical store for a plurality of products listed in said first electronic shopping list stored by the mobile electronic device, the product location information indicative of physical locations of in-store products in said physical store;
associate at least one store-specific location with a product on said electronic shopping list to create a second electronic shopping list;
said second electronic shopping list including a subset of items of said first electronic shopping list indicative of items on said first electronic shopping list located in said physical store;
said second electronic shopping list including said subset of items and appended associated store-specific product location information indicating where each of said subset of items are located in said physical retail store.

* * * * *